(12) United States Patent
Choi et al.

(10) Patent No.: US 10,970,428 B2
(45) Date of Patent: Apr. 6, 2021

(54) METHOD OF PROVIDING PERFORMANCE INDICATORS OF ROBOT HAND AND METHOD OF OPTIMIZING STRUCTURE OF ROBOT HAND

(71) Applicant: RESEARCH AND BUSINESS FOUNDATION SUNGKYUNKWAN UNIVERSITY, Suwon-si (KR)

(72) Inventors: Hyouk Ryeol Choi, Gunpo-si (KR); Gi Tae Kang, Suwon-si (KR); Anna Kim, Suwon-si (KR); Yong Bum Kim, Goyang-si (KR); Won Suk You, Suwon-si (KR); Gun Kyu Yee, Gunpo-si (KR); YoungHun Lee, Siheung-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 1277 days.

(21) Appl. No.: 15/088,430

(22) Filed: Apr. 1, 2016

(65) Prior Publication Data
US 2016/0292350 A1   Oct. 6, 2016

(30) Foreign Application Priority Data

Apr. 1, 2015   (KR) .................. 10-2015-0046181
Apr. 1, 2015   (KR) .................. 10-2015-0046185

(51) Int. Cl.
*G06G 7/48*     (2006.01)
*G06F 30/17*    (2020.01)
(Continued)

(52) U.S. Cl.
CPC .......... *G06F 30/17* (2020.01); *B25J 15/0009* (2013.01); *B25J 19/007* (2013.01); *G06F 30/20* (2020.01);
(Continued)

(58) Field of Classification Search
CPC .... B25J 15/10; B25J 15/0009; B25J 15/0206; B25J 19/007; B25J 9/1612;
(Continued)

(56) References Cited

U.S. PATENT DOCUMENTS

| 9,321,176 B1* | 4/2016 | Sun ..................... B25J 9/1612 |
| 2006/0199167 A1* | 9/2006 | Yang ................... G06F 17/5009 |
| | | 434/365 |
| 2007/0078564 A1* | 4/2007 | Hoshino ............ G06K 9/00362 |
| | | 700/245 |

FOREIGN PATENT DOCUMENTS

KR     10-1048762 B1     7/2011

OTHER PUBLICATIONS

Erkmen, Aydan M., and Mehmet Durna. "Genetic algorithm-based optimal regrasping with the Anthrobot 5-fingered robot hand." Proceedings. 1998 IEEE International Conference on Robotics and Automation (Cat. No. 98CH36146). vol. 4. IEEE, 1998. (Year: 1998).*

(Continued)

*Primary Examiner* — Rehana Perveen
*Assistant Examiner* — Nithya J. Moll
(74) *Attorney, Agent, or Firm* — NSIP Law

(57) ABSTRACT

Disclosed is a method of providing performance indicators of a robot hand and a method of optimizing a structure of the robot hand, and more particularly to a method of providing performance indicators of a robot hand, in which the performance indicators are to objectively compare a plurality of robot hands with respect to performance, and a method of optimizing a structure of the robot hand, in which engineering design criteria are provided to determine essential factors in developing the structure of the robot hand.

22 Claims, 20 Drawing Sheets

(51) Int. Cl.
- *B25J 15/00* (2006.01)
- *B25J 19/00* (2006.01)
- *G06F 30/20* (2020.01)
- *G06N 3/12* (2006.01)

(52) U.S. Cl.
CPC .... *G05B 2219/39539* (2013.01); *G06N 3/126* (2013.01); *Y10S 901/30* (2013.01)

(58) Field of Classification Search
CPC .. G06F 17/5086; G06F 17/11; G06F 17/5009; G06N 3/126; Y10S 901/30; G05B 2219/39539

See application file for complete search history.

(56) References Cited

OTHER PUBLICATIONS

Lim, Mee-Seub, et al. "A human-like real-time grasp synthesis method for humanoid robot hands." Robotics and Autonomous Systems 30.3 (2000): 261-271.*

* cited by examiner (PRIOR ART)

FIG. 10

| w = [1,1,0.5,0.5] | $v_1$ | $v_2$ | $v_3$ | $v_4$ | OT |
|---|---|---|---|---|---|
| Anthropomorphic DLR Hand | 37941 | 12103 | 6171 | 838 | $2.4945 \times 10^{-2}$ |
| UB Hand 4 | 24516 | 32131 | 8797 | 0 | $2.4002 \times 10^{-2}$ |
| SKKU Hand 4 | 44020 | 43522 | 6439 | – | $0.49474 \times 10^{-2}$ |

FIG. 11

| w = [1,1,0.5,0.5], k = 3 | $v_1$ | $v_2$ | $v_3$ | $v_4$ | $v_{12}$ | $v_{23}$ | $v_{34}$ | IF |
|---|---|---|---|---|---|---|---|---|
| Anthropomorphic DLR Hand | 37941 | 12103 | 6171 | 838 | 4 | 2549 | 6 | $6.6055 \times 10^{-4}$ |
| UB Hand 4 | 24516 | 32131 | 8797 | 0 | 0 | 0 | 0 | $5.4376 \times 10^{-4}$ |
| SKKU Hand 4 | 44020 | 43522 | 6439 | – | 39 | 0 | – | $3.4181 \times 10^{-4}$ |

FIG. 14

| generation times | IF |
|---|---|
| Initial settings | $4.2086 \times 10^{-4}$ |
| 1st generation | $4.5610 \times 10^{-4}$ |
| 2nd generation | $4.9104 \times 10^{-4}$ |
| 3nd generation | $5.0029 \times 10^{-4}$ |
| 4th generation | $6.0268 \times 10^{-4}$ |
| 5th generation | $6.3761 \times 10^{-4}$ |
| 6th generation | $7.7871 \times 10^{-4}$ |
| 7th to 10th generation | $8.6506 \times 10^{-4}$ |

FIG. 15

| setting values | Initial Settings | Optimized solution |
|---|---|---|
| x | 0 | 11 |
| y | 0 | -4 |
| z | 0 | 10 |
| $L_f$ | 146.00 | 143.85 |
| $L_t$ | 105.00 | 118.33 |
| $\psi_x$ | -45 | -36 |
| $\psi_y$ | -25 | -37 |
| $\psi_z$ | -45 | -57 |
| $q_r$ | 10 | 12 |
| IF | $4.2086 \times 10^{-4}$ | $8.6506 \times 10^{-4}$ |

METHOD OF PROVIDING PERFORMANCE INDICATORS OF ROBOT HAND AND METHOD OF OPTIMIZING STRUCTURE OF ROBOT HAND

CROSS-REFERENCE TO RELATED APPLICATION

This application claims priority from Korean Patent Application No. 10-2015-0046181, filed on Apr. 1, 2015 and Korean Patent Application No. 10-2015-0046185, filed on Apr. 1, 2015 in the Korean Intellectual Property Office, the disclosure of which is incorporated herein by reference.

BACKGROUND OF THE INVENTION (a) Field of the Invention

The present invention relates to a method of providing performance indicators of a robot hand and a method of optimizing a structure of the robot hand, and more particularly to a method of providing performance indicators of a robot hand, in which the performance indicators are to objectively compare a plurality of robot hands with respect to performance, and a method of optimizing a structure of the robot hand, in which engineering design criteria are provided to determine essential factors in developing the structure of the robot hand.

(b) Description of the Related Art

A conventional structure for a robot hand has been designed and developed depending on a developer's experience and inspiration so as to mimic a human's hand. Therefore, it was impossible to explain why positions and lengths of joints in the robot hand were determined and designed like that. For example, when a developer designs the structure of the robot hand and determines a position of a saddle joint for a thumb, he couldn't objectively explain why the saddle joint was designed to be positioned like that.

Accordingly, technologies have been required to develop a method of proposing design criteria calculated by an objective method with regard to essential factors needed for designing the robot hand, and optimizing the structure of the robot hand where the essential factors needed for designing the robot hand are explainable with objectively calculated numerical values.

Further, a conventional robot hand has been developed on the assumption that the robot hand being developed by developers has better performance than the existing robot hand.

In general, comparison in performance between different robot hands has been achieved by an object grasp experiment that the robot hands grasp the same object, thereby testing the performance of each robot. However, the method of evaluating the performance of the robot hand through the object grasp experiment cannot determine a structural problem of a robot hand model to be produced until it is actually manufactured as a robot hand. If the actually produced robot hand model has a structural problem, an additional development procedure is needed to modify the robot hand model and complement or solve the problem, thereby unnecessarily wasting costs and manpower.

By the way, 'opposability of thumb' has been used as a technique for objectively comparing the performance of the robot hand model, which has already been manufactured or is being developed, with that of a conventionally developed different robot hand. The 'opposability of thumb' provides a performance indicator calculated using only three factors including a workspace of fingertips, a length of a thumb and a weighting coefficient as major factors of the performance indicators in order to evaluate the performance of the robot hand. Therefore, it is not suitable to evaluate the performance of the robot hands developed to have various structures such as a robot hand model or the like for imitating a human's hand.

Accordingly, there is a need of developing a technology that can provide an objective numeral value corresponding to the performance of each robot hand when the robot hands modeled to have various structures are compared in performance.

PRIOR ART (Korean Patent 1) KR10-1048762 B1

SUMMARY OF THE INVENTION

Accordingly, the present invention is conceived to solve the foregoing problems, and an aspect of the present invention is to provide a method of providing performance indicators of a robot hand, in which objectively evaluated data about performance of a robot hand to be manufactured is provided before a robot hand model is actually manufactured.

Another aspect of the present invention is to provide a method of providing performance indicators of a robot hand, in which the performance indicators to be used as criteria for objectively comparing a plurality of actually manufactured robot hands with respect to performance are calculated and provided as numerical values.

Still another aspect of the present invention is to provide a method of optimizing a structure of a robot hand, in which design criteria calculated by an engineering method are provided to a developer who designs the structure of the robot hand depending on a designer's subjective experience and inspiration.

Yet another aspect of the present invention is to provide a method of optimizing a structure of a robot hand, in which an engineering-calculated essential factors including the length of each finger in the robot hand, a start point of a thumb, a motion angle of the thumb, etc. are provided as design criteria.

According to an embodiment of the present invention, there is provided a method of providing performance indicators of a robot hand, wherein the method performed by an operational system includes: receiving setting values for a model of a robot hand structure; calculating workspaces of a thumb tip and finger tips involved in the model based on the received setting values; and calculating performance indicators through 'interactivity of fingers' that reflects a volume range where the thumb tip and two finger tips can meet one another.

The thumb tip and the two finger tips may include the thumb tip, an arbitrary finger tip among the finger tips and a finger tip adjacent to the arbitrary finger tip.

The setting values may include: a finger length setting values for information about lengths of the thumb tip and the finger tips involved in the model; thumb start coordinates for a start point of the thumb involved in the model; angle setting values for information about an area where the thumb and the fingers involved in the model of the robot hand structure are movable; and joint movable range values for movable ranges of joints respectively corresponding to the thumb and the fingers involved in the model of the robot hand structure.

The receiving the setting values may include receiving a length value of the thumb and length values of the fingers if the fingers in the model have the same length, and receiving a length value of the thumb and an average length value of the fingers as the finger length setting values if the finger in the model are different in length.

The thumb start coordinates may include x, y and z coordinates of the start point of the thumb in a spatial coordinate system.

The angle setting values may include: angle values between adjacent fingers with respect to a metacarpal; an angle value obtained by rotating the thumb with respect to an x axis at the start point of the thumb; an angle value obtained by rotating the thumb with respect to a y axis at the start point of the thumb on the spatial coordinate system; and an angle value obtained by rotating the thumb with respect to a z axis at the start point of the thumb on the spatial coordinate system.

The joint movable range values may include: a thumb proximal-interphalangeal-joint lateral-movable-range angle value indicating a movable range where a proximal interphalangeal joint of a thumb is movable laterally with respect to a metacarpal front in the model; a thumb proximal-interphalangeal-joint front-movable-range angle value indicating a movable range where the proximal interphalangeal joint of the thumb is movable toward the metacarpal; a thumb middle-interphalangeal-joint front-movable-range angle value indicating a movable range where a middle interphalangeal joint of the thumb is movable toward the metacarpal; a thumb distal-interphalangeal-joint front-movable-range angle value indicating a movable range where a distal interphalangeal joint of the thumb is movable toward the metacarpal; a finger proximal-interphalangeal-joint lateral-movable-range angle value indicating a movable range where a proximal interphalangeal joint of each finger is movable laterally; a finger proximal-interphalangeal-joint front-movable-range angle value indicating a movable range where the proximal interphalangeal joint of each finger is movable toward the metacarpal; and a finger middle and distal-interphalangeal-joint front-movable-range angle value indicating a movable range where the distal interphalangeal joint and the middle interphalangeal joint of each finger are movable toward the metacarpal if the distal interphalangeal joint of the finger is designed to be movable depending on the middle interphalangeal joint, or On the other hand, if the distal interphalangeal joint of the finger is designed to be movable independently of the middle interphalangeal joint, the joint movable range values may include the thumb proximal-interphalangeal-joint lateral-movable-range angle value; the thumb proximal interphalangeal joint front-movable range angle value; the thumb middle interphalangeal joint front-movable range angle value; the thumb distal interphalangeal joint front-movable range angle value; the finger proximal-interphalangeal joint lateral-movable range angle value; the finger proximal interphalangeal joint front-movable range angle value; a finger middle-interphalangeal-joint front-movable-range angle value indicating a movable range where the middle interphalangeal joint of each finger is movable toward the metacarpal; and a finger distal-interphalangeal-joint front-movable-range angle value indicating a movable range where the distal interphalangeal joint of each finger is movable toward the metacarpal.

The calculating the workspace may include calculating a distance di between the start point of the thumb and the start point of an $i^{th}$ finger based on x, y and z coordinates of the start point of the thumb, the length values of the rest fingers and the angle values between the adjacent fingers with respect to the metacarpal, which are included in the received setting values.

The 'interactivity of fingers' is expressed as follows:

$$IF = \frac{\sum_{i=1}^{n-1} w_i d_i}{(n-1)\theta_{total} L_t^2 L_f^2} \left( \sum_{i=1}^{n-1} w_i v_i + k \sum_{i=1}^{n-2} w_i w_{i+1} v_{ii+1} \right)$$

where, IF is the calculated interactivity value among the thumb and the fingers; $W_i$ is a weight coefficient of the $i^{th}$ finger previously stored in a storage as a value previously assigned to the $i^{th}$ finger and ranging from 0 to 1; $d_i$ is a distance between the start point of the thumb and the start point of the $i^{th}$ finger; n is the number of thumb and fingers; n−1 is the number of fingers; $\theta_{total}$ is the total of movable range angle values of the joints included in the fingers controllable in the model of the robot hand structure; $L_t$ is the length of the thumb as a value included in the received setting values; $L_f$ is the length of the fingers as a value included in the setting values; Vi is a volume range where the thumb tip and the $i^{th}$ finger tip can meet; $W_{i+1}$ is a weight coefficient of the $(i+1)^{th}$ finger previously stored in the storage as a vale previously assigned to the $(i+1)^{th}$ finger adjacent to the $i^{th}$ finger and ranging from 0 to 1; $V_{ii+1}$ is a volume range where the thumb tip, the $i^{th}$ finger tip and the $(i+1)^{th}$ finger tip adjacent to the $i^{th}$ finger can meet one another; and k is a compensation coefficient previously stored in the storage to adjust an effect level of $V_i$ and $V_{ii+1}$.

According to another embodiment of the present invention, there is provided a method of optimizing a structure of a robot hand, wherein the method performed by an operational system includes: receiving initial setting values for a model of a robot hand structure; calculating initial interactivity values between thumb and fingers through 'interactivity of fingers' that reflects a volume range where a thumb tip and two finger tips can meet one another, based on the received setting values; calculating a plurality of secondary interactivity values based on the initial interactivity values and the initial setting values by an optimization algorithm; and extracts a maximum secondary interactivity value among the plurality of secondary interactivity values and calculating optimized design values based on the setting values of the extracted maximum secondary interactivity value.

The thumb tip and the two finger tips may include the thumb tip, an arbitrary finger tip among the finger tips and a finger tip adjacent to the arbitrary finger tip.

The initial setting values may include: a finger length setting values for information about lengths of the thumb tip and the finger tips involved in the model; thumb start coordinates for a start point of the thumb involved in the model; angle setting values for information about an area where the thumb and the fingers involved in the model of the robot hand structure are movable; and joint movable range values for movable ranges of joints respectively corresponding to the thumb and the fingers involved in the model of the robot hand structure.

The receiving the initial setting values may include: receiving a length value of the thumb and length values of the fingers as the finger length setting values if the fingers in the model have the same length, and receiving a length value of the thumb and an average length value of the fingers if the finger in the model are different in length.

The thumb start coordinates may include x, y and z coordinates of the start point of the thumb in a spatial coordinate system.

The angle setting values may include: angle values between adjacent fingers with respect to a metacarpal; an angle value obtained by rotating the thumb with respect to an x axis at the start point of the thumb; an angle value obtained by rotating the thumb with respect to a y axis at the start point of the thumb on the spatial coordinate system; and an angle value obtained by rotating the thumb with respect to a z axis at the start point of the thumb on the spatial coordinate system.

The joint movable range values may include: a thumb proximal-interphalangeal-joint lateral-movable-range angle value indicating a movable range where a proximal interphalangeal joint of a thumb is movable laterally with respect to a metacarpal front in the model; a thumb proximal-interphalangeal-joint front-movable-range angle value indicating a movable range where the proximal interphalangeal joint of the thumb is movable toward the metacarpal; a thumb middle-interphalangeal-joint front-movable-range angle value indicating a movable range where a middle interphalangeal joint of the thumb is movable toward the metacarpal; a thumb distal-interphalangeal-joint front-movable-range angle value indicating a movable range where a distal interphalangeal joint of the thumb is movable toward the metacarpal; a finger proximal-interphalangeal-joint lateral-movable-range angle value indicating a movable range where a proximal interphalangeal joint of each finger is movable laterally; a finger proximal-interphalangeal-joint front-movable-range angle value indicating a movable range where the proximal interphalangeal joint of each finger is movable toward the metacarpal; and a finger middle and distal-interphalangeal-joint front-movable-range angle value indicating a movable range where the distal interphalangeal joint and the middle interphalangeal joint of each finger are movable toward the metacarpal if the distal interphalangeal joint of the finger is designed to be movable depending on the middle interphalangeal joint, or a finger middle-interphalangeal-joint front-movable-range angle value indicating a movable range where the middle interphalangeal joint of each finger is movable toward the metacarpal and a finger distal-interphalangeal-joint front-movable-range angle value indicating a movable range where the distal interphalangeal joint of each finger is movable toward the metacarpal if the distal interphalangeal joint of the finger is designed to be movable independently of the middle interphalangeal joint.

The 'interactivity of fingers' is expressed as follows:

$$IF = \frac{\sum_{i=1}^{n-1} w_i d_i}{(n-1)\theta_{total} L_t^2 L_f^2} \left( \sum_{i=1}^{n-1} w_i v_i + k \sum_{i=1}^{n-2} w_i w_{i+1} v_{ii+1} \right)$$

where, IF is the calculated interactivity value among the thumb and the fingers; $W_i$ is a weight coefficient of the $i^{th}$ finger previously stored in a storage as a value previously assigned to the $i^{th}$ finger and ranging from 0 to 1; $d_i$ is a distance between the start point of the thumb and the start point of the $i^{th}$ finger; n is the number of thumb and fingers; n−1 is the number of fingers; $\theta_{total}$ is the total of movable range angle values of the joints included in the fingers controllable in the model of the robot hand structure; $L_t$ is the length of the thumb as a value included in the received setting values; $L_f$ is the length of the fingers as a value included in the setting values; Vi is a volume range where the thumb tip and the $i^{th}$ finger tip can meet; $W_{i+1}$ is a weight coefficient of the $(i+1)^{th}$ finger previously stored in the storage as a vale previously assigned to the $(i+1)^{th}$ finger adjacent to the $i^{th}$ finger and ranging from 0 to 1; $V_{ii+1}$ is a volume range where the thumb tip, the $i^{th}$ finger tip and the $(i+1)^{th}$ finger tip adjacent to the $i^{th}$ finger can meet one another; and k is a compensation coefficient previously stored in the storage to adjust an effect level of $V_i$ and $V_{ii+1}$.

The calculating the interactivity values may include: calculating a finger workspace that refers to a 3D spatial range where the thumb and the fingers provided in the model are movable, wherein the calculating the workspace includes calculating a distance $d_i$ between the start point of the thumb and the start point of an $i^{th}$ finger based on x, y and z coordinates of the start point of the thumb, the length values of the rest fingers and the angle values between the adjacent fingers with respect to the metacarpal, which are included in the received initial setting values.

The optimization algorithm may include a genetic algorithm.

BRIEF DESCRIPTION OF THE DRAWINGS

The above and/or other aspects of the present invention will become apparent and more readily appreciated from the following description of the exemplary embodiments, taken in conjunction with the accompanying drawings, in which:

FIG. 10 tabulates the results of the performance indicators based on the conventional 'opposability of thumb' with regard to the existing robot hand models;

FIG. 11 tabulates the results of the performance indicators based on performance indicators according to an embodiment of the present invention with regard to the existing robot hand models.

FIG. 14 tabulates results of optimization based on a genetic algorithm in the method of optimizing the structure of the robot hand according to an embodiment of the present invention; and FIG. 15 tabulates input initial setting values and optimized setting values in a robot hand model according to an embodiment of the present invention.

DETAILED DESCRIPTION OF THE EMBODIMENTS

Figure 1A:
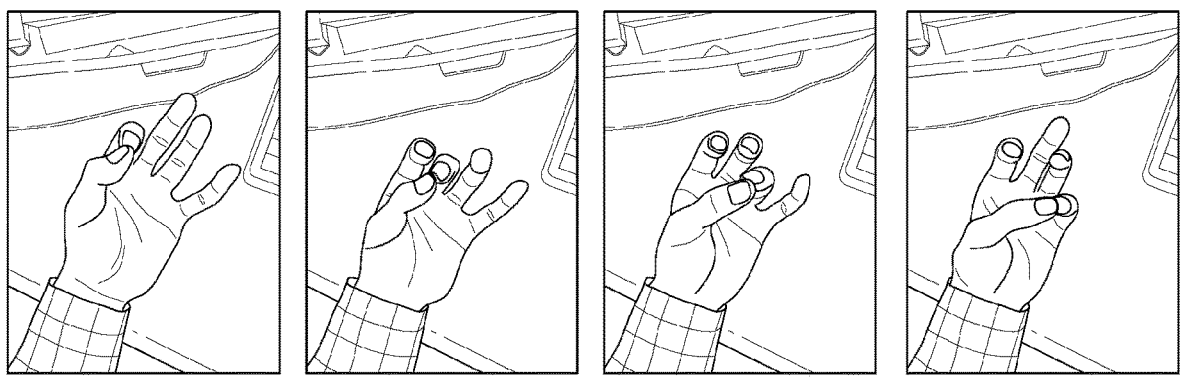
FIG. 1A illustrates the 'opposability of thumb' as a conventional performance indicator and FIG. 1B illustrates an 'interactivity of fingers' as performance indicators according to an embodiment of the present invention.

The following detailed descriptions of the present invention references accompanying drawings illustrating certain embodiments for realizing the present invention by way of example. These embodiments are described in detail so as to be realized by those skilled in the art. It has to be appreciated that various embodiments of the present invention are different from each other but not mutually exclusive. For example, a certain shape, a structure and features described set forth herein according to an embodiment of the present invention may be achieved by another embodiment without departing from the scope of the present invention. Further, it will be understood that the position or arrangement of the elements disclosed in to the embodiments may be modified without departing from the idea and scope of the present invention. Therefore, the following detailed descriptions are not construed as the restrictions, but limited by the appended claims and their equivalents as long as they are properly explained. In the drawings, like numerals refer to like elements.

In the description of the exemplary embodiments, an ordinal number used in terms such as a first element, a second element, etc. is employed for describing variety of elements, and the terms are used for distinguishing between one element and another element. For example, the first element may be called the second element, and vice versa without departing from the scope of the present invention. Further, a term of 'and/or' includes combination of a plurality of related items or one among the plurality of related items.

Further, the terms used in this specification are just for describing a certain exemplary embodiment, and not intended to limit the present invention. A singular form involves a plural form as long as it is not distinctly different from the plural form in the context. In addition, it has to be understood that terms such as "include" or "have" refer to presence of features, numbers, steps, operations, elements or combination thereof, and do not exclude presence or addition of one or more other features, numbers, steps, operations, elements or combination thereof.

All the terms set forth herein including technical or scientific words have the same meaning as those generally understood by a person having ordinary knowledge in the art to which the present invention pertains unless they are defined differently. The words generally used and defined in dictionaries have to be construed as meaning equivalent to the contextual meaning in the related art, and have to be not construed as ideal or excessively cursory meaning unless they are clearly defined.

If a certain element "includes" another element throughout the specification, it means that the certain element does not exclude another element but is opened to have another element. Further, " . . . section", "module" or the like refers to a unit of processing at least one function or operation, and this may be achieved by hardware, software or combination of hardware and software.

To make a person, who has ordinary knowledge in the art to which the present invention pertains, easily materialize the present invention, preferred embodiments of the present invention will be described below with reference to accompanying drawings.

First, an 'interactivity of fingers' used in a method of providing performance indicators of a robot hand according to an embodiment of the present invention will be described with reference to FIG. 1.

Figure 1B:
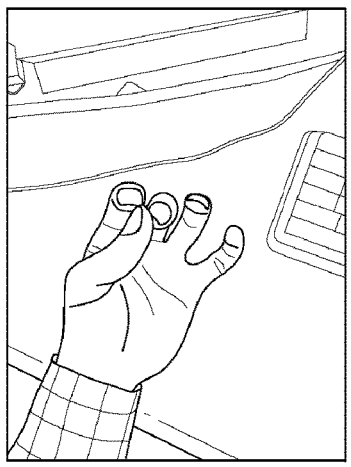
Figure 1B:
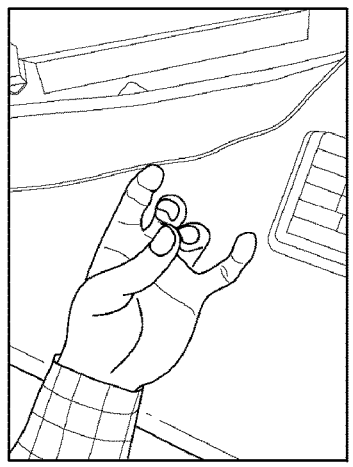
Figure 1B:
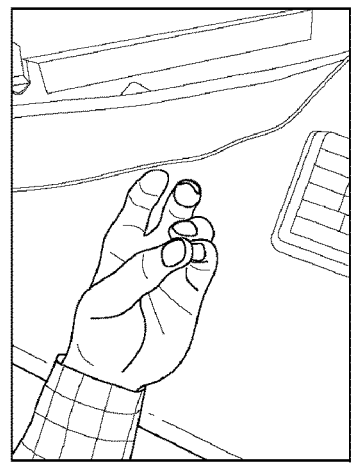

FIG. 1A illustrates the 'opposability of thumb' as a conventional performance indicator and FIG. 1B illustrates an 'interactivity of fingers' as performance indicators according to an embodiment of the present invention.

FIG. 1A shows the 'opposability of thumb' as the conventional performance indicator.

Referring to FIG. 1A, the 'opposability of thumb' of the conventional performance indicator calculates performance indicators of a robot hand model based on only a length of a thumb of the robot hand model and a sum of volume ranges where a thumb tip and finger tips can meet each other. Therefore, it is impossible to objectively compare the robot hands having different structures.

In more detail, if the fingers other than the thumb are extended while the length of the thumb in the robot hand model is maintained, workspaces for the respective fingers of the robot hand model are increased and therefore the performance indicators calculated by the 'opposability of thumb' are also increased. In this case, although the values of the performance indicators calculated by the 'opposability of thumb' are increased, a general shape of the robot hand model is different from a human's hand since a length of an index finger in the robot hand model is not separately taken into account. In other words, the robot hand model in this case is similar to hands of an orangutan, a chimpanzee and the like primates. That is, the robot hand models modelled by the performance indicators calculated by the 'opposability of thumb' cannot properly mimic a human's hand having a shape and function for accurately grasping an object.

On the other hand, FIG. 1B shows the 'interactivity of fingers' as the performance indicators according to an embodiment of the present invention.

Referring to FIG. 1B, the 'interactivity of fingers' as the performance indicators according to an embodiment of the present invention numerically calculates the shape and function of the human's hand for accurately grasping an object. If force is applied in three directions, it is possible to stably grasp an object in a 3D space. That is, a thumb and two fingers, i.e. a thumb, an arbitrary finger, and a finger adjacent to the arbitrary finger can stably grasp an object. While the 'Opposability of thumb' for the conventional performance indicators reflects only the length of the thumb and the sum of volume ranges where the thumb tip and each of the finger tips can meet each other, the 'interactivity of fingers' for the performance indicators according to an embodiment of the present invention reflects a volume range where the thumb tip, the arbitrary finger tip and the finger tip adjacent to the arbitrary finger tip can meet one another.

Next, an operational system for computes the method of providing the performance indicators of the robot hand according to an embodiment of the present invention will be described in detail with reference to the following drawings.

Figure 2:
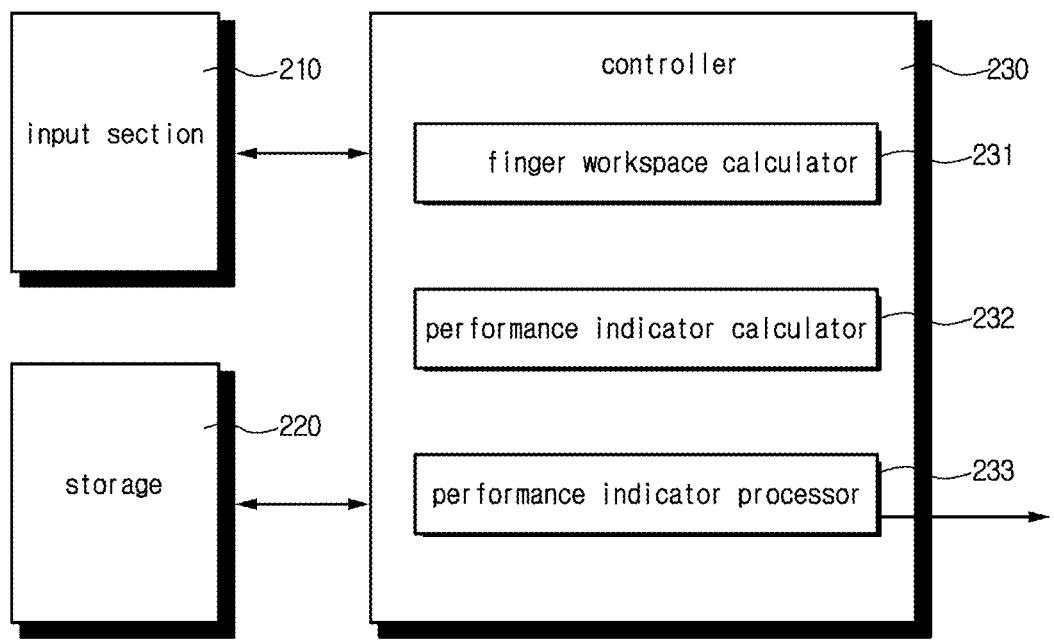
FIG. 2 is a block diagram of an operational system that computes the method of providing the performance indicators of the robot hand according to an embodiment of the present invention.

FIG. 2 is a block diagram of an operational system that computes the method of providing the performance indicators of the robot hand according to an embodiment of the present invention;

Referring to FIG. 2, the operational system 200 according to an embodiment of the present invention includes an input section 210, a storage 220 and a controller 230.

The input section 210 receives setting values for a model of a robot hand structure and transmits the setting values to the controller 230.

In more detail, the setting values according to an embodiment of the present invention will be described with reference to FIG. 3 and FIG. 4.

Figure 3:
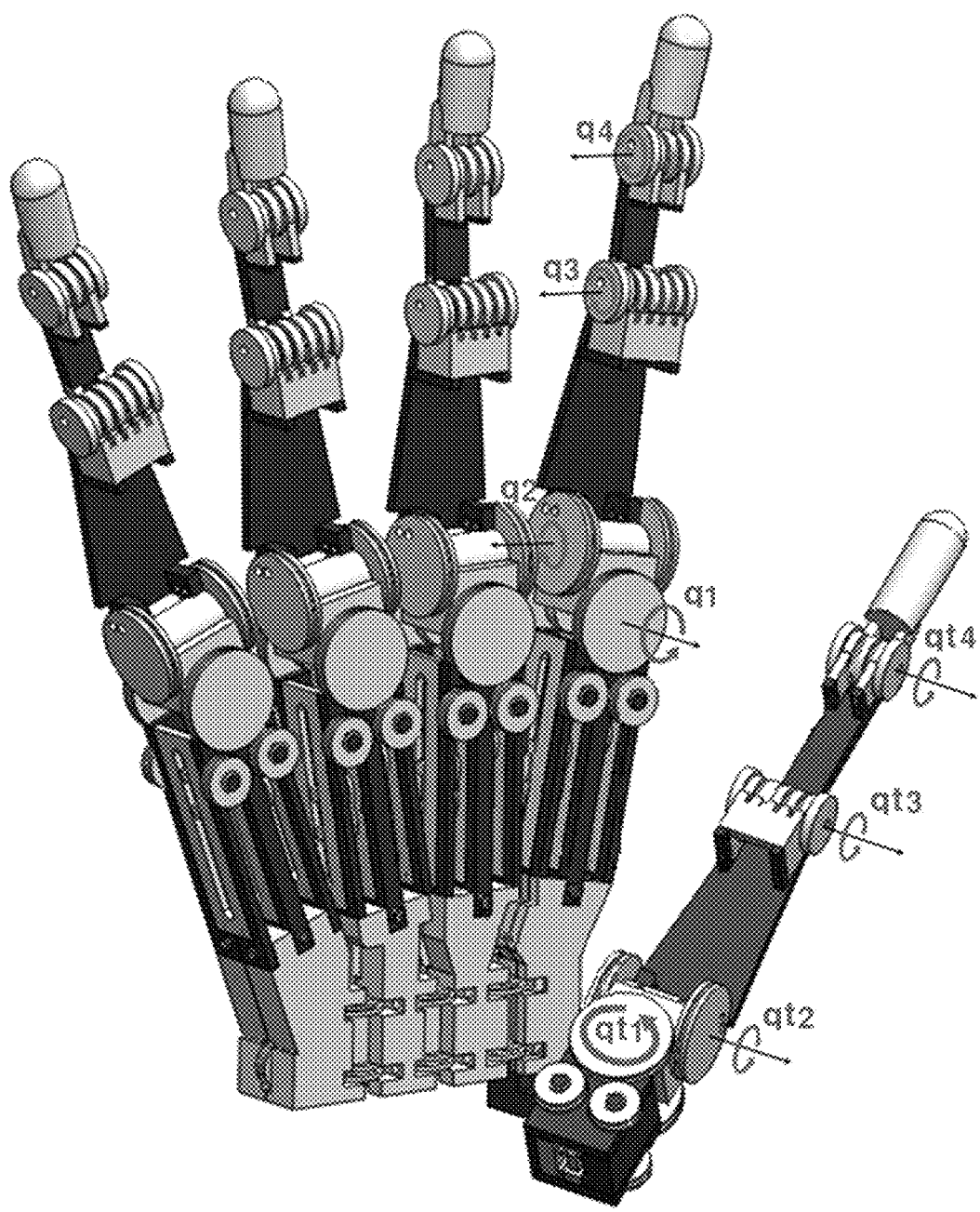
FIG. 3 illustrates input setting values for a robot hand model according to an embodiment of the present invention.
Figure 4:
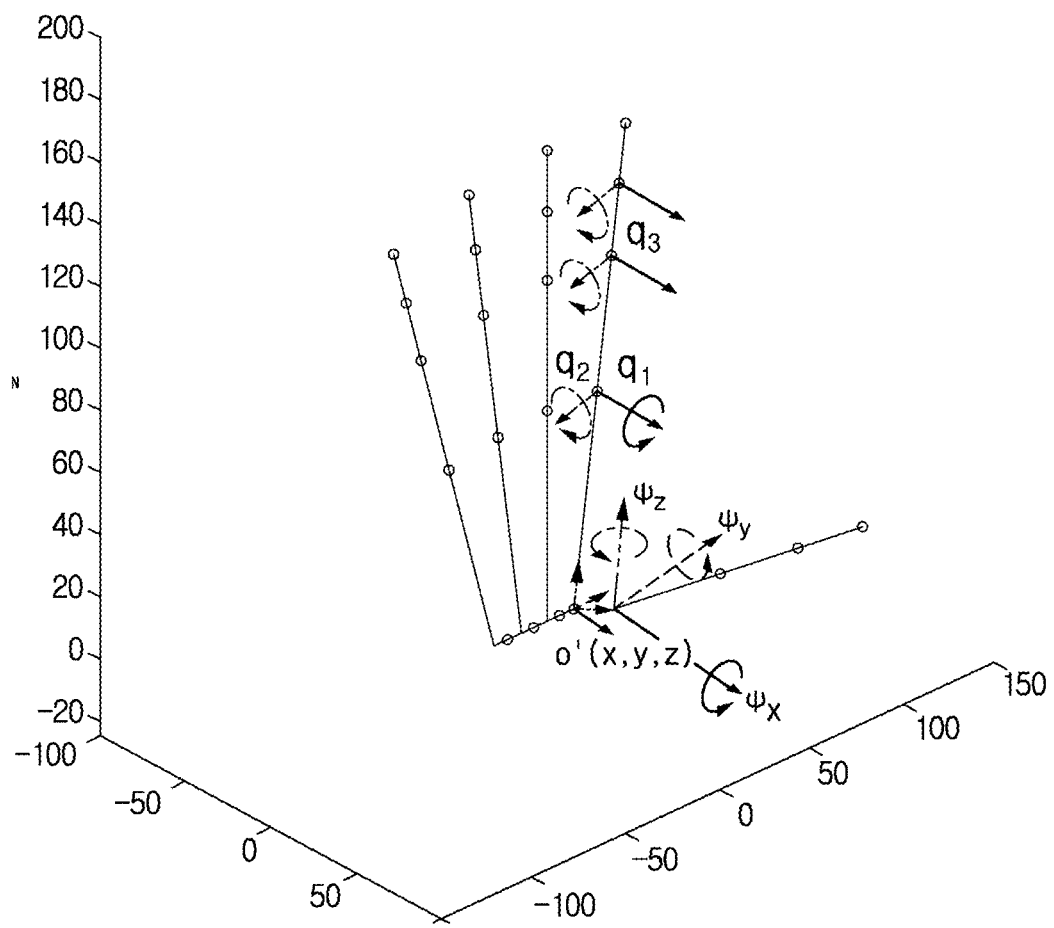
FIG. 4 illustrates a robot hand model modelled in 3D based on the input setting values according to an embodiment of the present invention.

FIG. 3 illustrates input setting values for a robot hand model according to an embodiment of the present invention, and FIG. 4 illustrates a robot hand model modeled in 3D based on the input setting values according to an embodiment of the present invention.

Referring to FIG. 3 and FIG. 4, the setting values input to the input section 210 may include finger length setting values for information about lengths of fingers involved in a model of a robot hand structure; thumb start coordinates for a start point of a thumb involved in the model of the robot hand structure; angle setting values for information about an area where the thumb and the rest fingers involved in the model of the robot hand structure are movable; and joint movable range values for movable ranges of joints respectively corresponding to the thumb and the rest fingers involved in the model of the robot hand structure.

As shown in FIG. 3 if the fingers except the thumb have the same length Lf in the model of the robot hand structure, the setting values input to the input section 210 may include the length $L_t$ of the thumb and the length $L_f$ of the fingers as the finger length setting values.

On the other hand, if the fingers except the thumb have different lengths in the model of the robot hand structure, the setting values input to the input section 210 may include the length Lt of the thumb and an average length of the fingers as the finger length setting values.

As shown in FIG. 4, the setting values input to the input section 210 may include x, y and z coordinates of a thumb start point O' as thumb start coordinates.

Further, as shown in FIG. 3 and FIG. 4, the angle setting values among the setting values input to the input section 210 may include angle values qr between adjacent fingers with respect to a metacarpal; an angle value $\Psi_x$ obtained by rotating the thumb with respect to an x axis at the start point of the thumb indicated by the thumb start point O' on the spatial coordinate system, an angle value $\Psi_y$ obtained by rotating the thumb with respect to a y axis at the start point of the thumb on the spatial coordinate system, and an angle value $\Psi_z$ obtained by rotating the thumb with respect to a z axis at the start point of the thumb on the spatial coordinate system.

In addition, if a distal interphalangeal joint of the finger is designed to be movable independently of a middle interphalangeal joint as shown in FIG. 3, joint movable range values among the setting values input to the input section 210 according to an embodiment of the present invention may include a thumb proximal-interphalangeal-joint lateral-movable-range angle value $q_{t1}$ indicating a movable range where a proximal interphalangeal joint of a thumb is movable laterally (left and right) with respect to a metacarpal front in the model of the robot hand structure; a thumb proximal-interphalangeal-joint front-movable-range angle value $q_{t2}$ indicating a movable range where the proximal interphalangeal joint of the thumb is movable toward the metacarpal; a thumb middle-interphalangeal-joint front-movable-range angle value $q_{t3}$ indicating a movable range where a middle interphalangeal joint of the thumb is movable toward the metacarpal; a thumb distal-interphalangeal-joint front-movable-range angle value $q_{t4}$ indicating a movable range where a distal interphalangeal joint of the thumb is movable toward the metacarpal; a finger proximal-interphalangeal-joint lateral-movable-range angle value $q_l$ indicating a movable range where a proximal interphalangeal joint of each finger is movable laterally; a finger proximal-interphalangeal-joint front-movable-range angle value $q_2$ indicating a movable range where the proximal interphalangeal joint of each finger is movable toward the metacarpal; a finger middle-interphalangeal-joint front-movable-range angle value $q_3$ indicating a movable range where the middle interphalangeal joint of each finger is movable toward the metacarpal; and a finger distal-interphalangeal-joint front-movable-range angle value $q_4$ indicating a movable range where the distal interphalangeal joint of each finger is movable toward the metacarpal.

On the other hand, if the distal interphalangeal joint of the finger is designed to be movable depending on the middle interphalangeal joint, the joint movable range values among the setting values input to the input section 210 according to an embodiment of the present invention may include a thumb proximal-interphalangeal-joint lateral-movable-range angle value $q_{t1}$ indicating a movable range where the proximal interphalangeal joint of the thumb is movable laterally (left and right) with respect to a metacarpal front in the model of the robot hand structure; a thumb proximal-interphalangeal-joint front-movable-range angle value $q_{t2}$ indicating a movable range where the proximal interphalangeal joint of the thumb is movable toward the metacarpal; a thumb middle-interphalangeal-joint front-movable-range angle value $q_{t3}$ indicating a movable range where the middle interphalangeal joint of the thumb is movable toward the metacarpal; a thumb distal-interphalangeal-joint front-movable-range angle value $q_{t4}$ indicating a movable range where the distal interphalangeal joint of the thumb is movable toward the metacarpal; a finger proximal-interphalangeal-joint lateral-movable-range angle value $q_1$ indicating a movable range where the proximal interphalangeal joint of each finger is movable laterally; a finger proximal-interphalangeal-joint front-movable-range angle value $q_2$ indicating a movable range where the proximal interphalangeal joint of each finger is movable toward the metacarpal; and a finger middle and distal-interphalangeal-joint front-movable-range angle value $q_3$ indicating a movable range where the distal interphalangeal joint and the middle interphalangeal joint of each finger are movable toward the metacarpal.

The controller 230 may control operations of the input section 210 and the storage 220.

Further, the controller 230 may include a finger workspace calculator 231, a performance indicator calculator 232 and a performance indicator processor 233.

The controller 230 may receive setting values for a model of a robot hand structure through the input section 210.

The finger workspace calculator 231 may calculate a distance $d_i$ between the start point O' of the thumb and the start point of an $i^{th}$ finger from the thumb start coordinates, the finger length setting values and the angle setting values of the received setting values.

In more detail, the finger workspace calculator 231 may calculate a distance di between the start point O' of the thumb and the start point of the $i^{th}$ finger based on x, y and z coordinates of the thumb start point O', the length $L_t$ of the thumb, the lengths $L_f$ of the rest fingers, the angle values $q_r$, between the adjacent fingers with respect to the metacarpal, which are included in the received initial setting values. Of course, the distance di may be directly input to the input section 210.

Further, the finger workspace calculator 231 may calculate a workspace, in which the thumb tip and the rest finger tips are movable, based on the initial setting value received from the input section 210 and the distance $d_i$. Furthermore, a workspace overlapped among the thumb and the fingers may be also calculated.

The performance indicator calculator 232 may calculate interactivity values among the fingers as the performance indicators by the setting values received in the input section 210 and the 'interactivity of fingers' with regard to the workspaces of the thumb and the rest fingers calculated by the finger workspace calculator 231. The 'interactivity of fingers' reflects a volume range where the thumb tip, an arbitrary finger tip, and a finger tip adjacent to the arbitrary finger tip included in the model of the robot hand structure can meet one another.

In more detail, the 'interactivity of fingers' according to an embodiment of the present invention is expressed as follows, $$IF = \frac{\sum_{i=1}^{n-1} w_i d_i}{(n-1)\theta_{total} L_t^2 L_f^2} \left( \sum_{i=1}^{n-1} w_i v_i + k \sum_{i=1}^{n-2} w_i w_{i+1} v_{ii+1} \right)$$

where, IF is the calculated interactivity value among the thumb and the fingers; $W_i$ is a weight coefficient of the $i^{th}$ finger previously stored in the storage 220 as a value previously assigned to the $i^{th}$ finger and ranging from 0 to 1; $d_i$ is a distance between the start point O' of the thumb and the start point of the $i^{th}$ finger calculated by the finger workspace calculator 231; n is the number of thumb and fingers; n−1 is the number of fingers; $\theta_{total}$ is the total of movable range angle values of the joints included in the fingers controllable in the model of the robot hand structure; $L_t$ is the length of the thumb as a value included in the received setting values; $L_f$ is the length of the fingers as a value included in the setting values; Vi is a volume range where the thumb tip and the $i^{th}$ finger tip can meet; $W_{i+1}$ is a weight coefficient of the $(i+1)^{th}$ finger previously stored in the storage as a vale previously assigned to the $(i+1)^{th}$ finger adjacent to the $i^{th}$ finger and ranging from 0 to 1; $V_{ii+1}$ is a volume range where the thumb tip, the $i^{th}$ finger tip and the $(i+1)^{th}$ finger tip adjacent to the $i^{th}$ finger can meet one another; and k is a compensation coefficient previously stored in the storage 220 to adjust an effect level of $V_i$ and $V_{ii+1}$.

The performance indicator processor 233 may output the performance indicators, which are calculated by the performance indicator calculator 232 as the performance indicators in the model of the robot hand structure indicated by the setting values received through the input section 210, to a display (not shown) provided in the outside of the operational system 200.

Below, the method of providing the performance indicators of the robot hand according to an embodiment of the present invention will be described with reference to the accompanying drawings.

Figure 5:
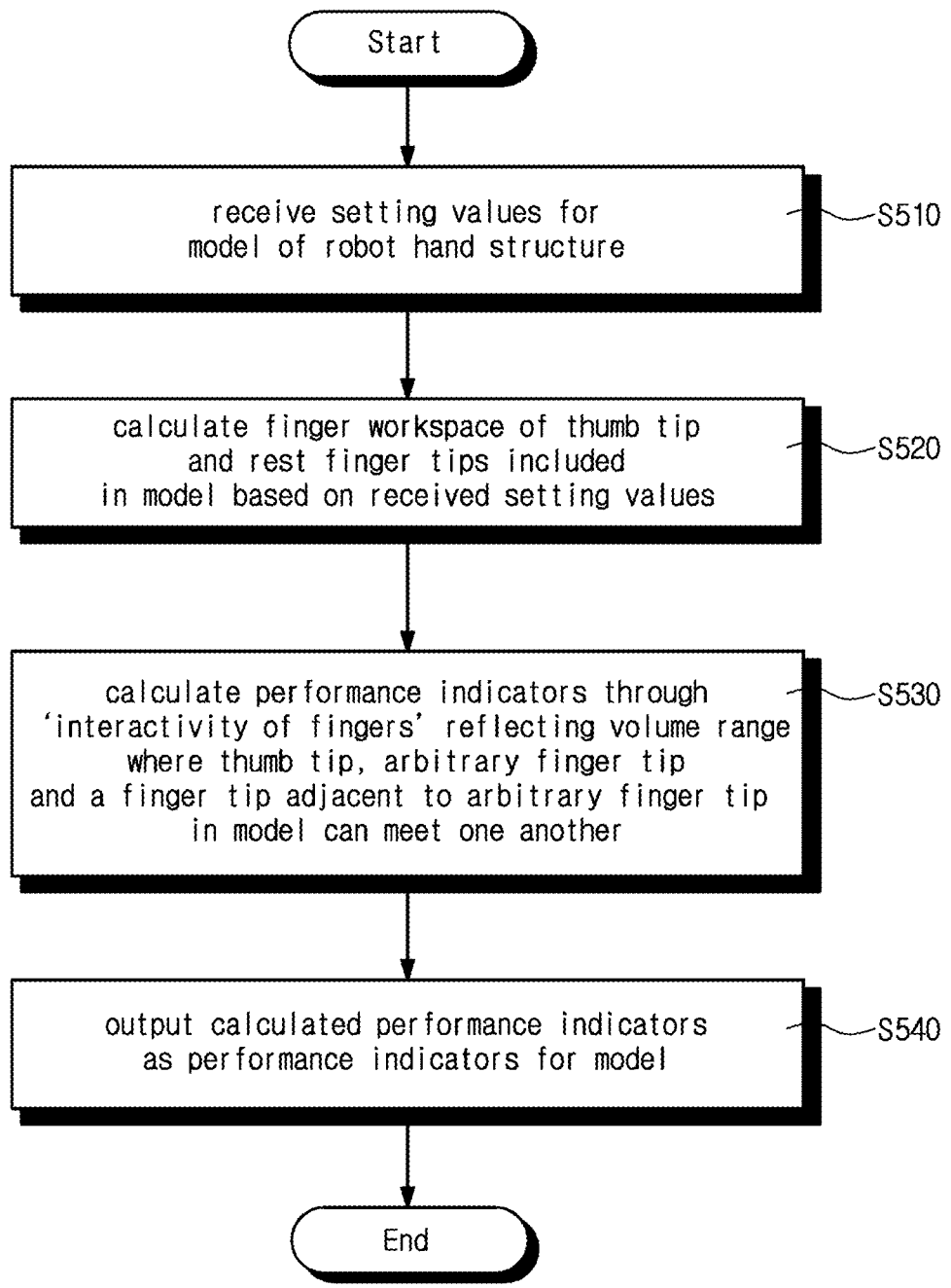
FIG. 5 is a flowchart of a method of providing performance indicators of a robot hand according to an embodiment of the present invention.

FIG. 5 is a flowchart of a method of providing performance indicators of a robot hand according to an embodiment of the present invention.

Referring to FIG. 5, the controller 230 of the operational system 200 according to an embodiment of the present invention performs a step of receiving the setting values to receive the setting values for the model of the robot hand structure through the input section 210 (S510).

Then, the controller 230 performs a step of calculating a finger workspace to calculate the distance $d_i$ between the start point O' of the thumb and the start point of the $i^{th}$ finger from the thumb start coordinates, the finger length setting values and the angle setting values, which are included in the setting values received in the step of receiving the setting value, and calculate the finger workspace corresponding to the movable range of each finger tip (S520).

Next, the controller 230 performs a step of calculating the performance indicators to calculate the performance indicators based on the interactivity values among the thumb and the fingers indicating the performance indicators for the model of the robot hand structure by the received setting values and the 'interactivity of fingers' reflecting the volume range where the thumb tip, an arbitrary finger tip and a finger tip adjacent to the arbitrary finger tip in the model of the robot hand structure can meet one another with respect to the calculated work space of the thumb tip and the finger tips (S530).

Then, the controller 230 outputs the calculated performance indicators as the performance indicators for the model of the robot hand structure indicated by the setting values received in the step of receiving the setting values (S540).

Below, the method of providing the performance indicators of the robot hand, which can provide the performance indicators with regard to the plurality of robot hand models according to an embodiment of the present invention, will be described with reference to the accompanying drawings.

Figure 6A:
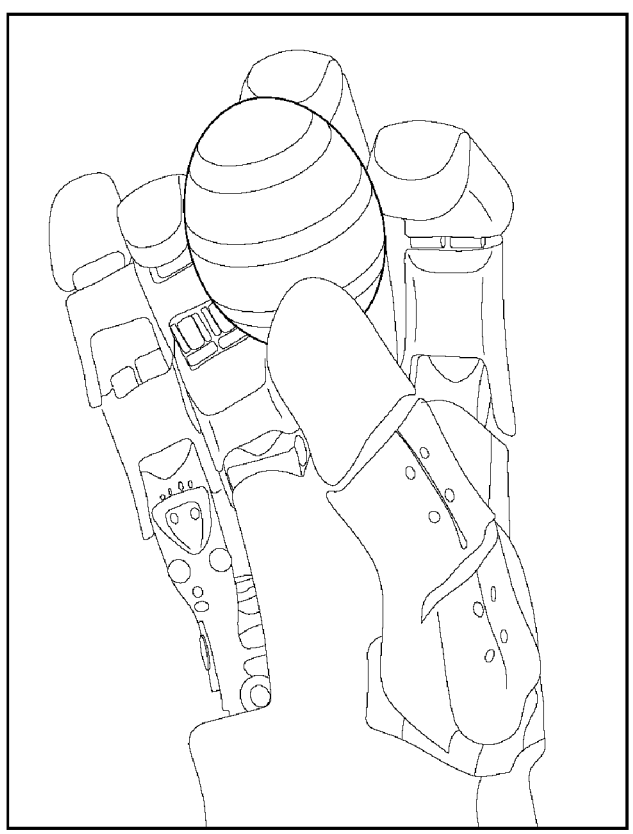
FIGS. 6A, 6B and 6C illustrate conventional robot hand models.
Figure 6B:
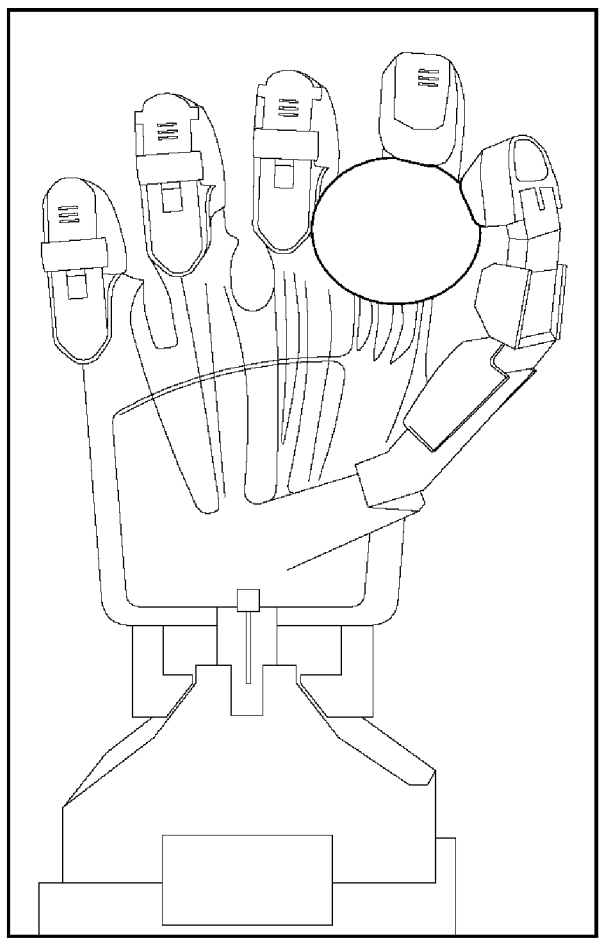
Figure 6C:
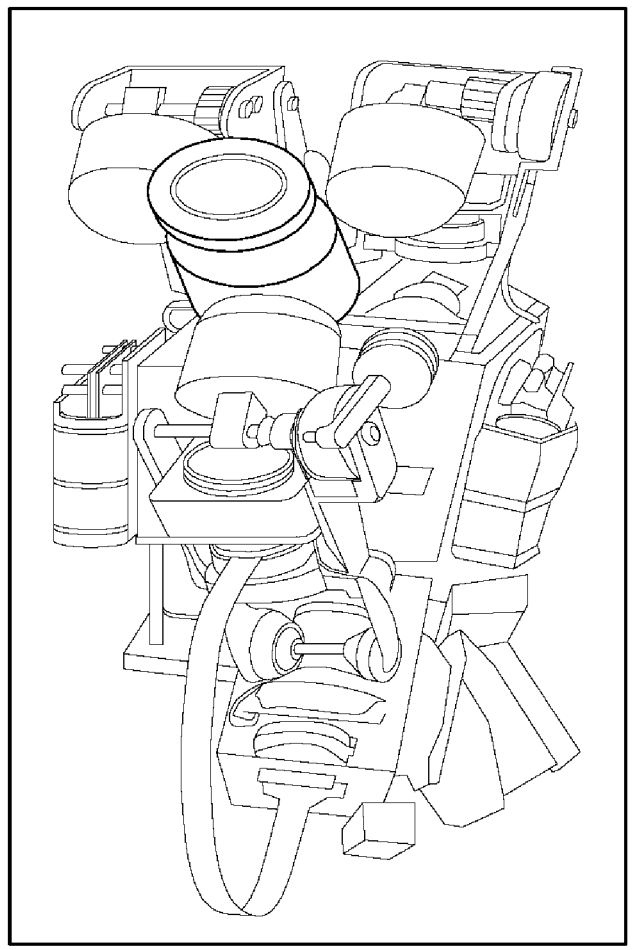

FIGS. 6A-6C illustrate conventional robot hand models.

FIG. 6A shows the robot hand (Anthropomorphic DLR Hand) developed by the Aerospace Center in Germany, the motion of which is the most sophisticated among the existing robot hands.

FIG. 6B shows the robot hand (UB Hand 4) developed by University of Bologna in Italy, which has a sophisticated motion a little less than that of the Anthropomorphic DLR Hand but has a simpler robot-hand structure than the Anthropomorphic DLR Hand.

FIG. 6C shows the robot hand (SKKU Hand 4) developed by University of Seonggyungwan in Korea, which is a representative robot hand developed in Korea.

Figure 7A:
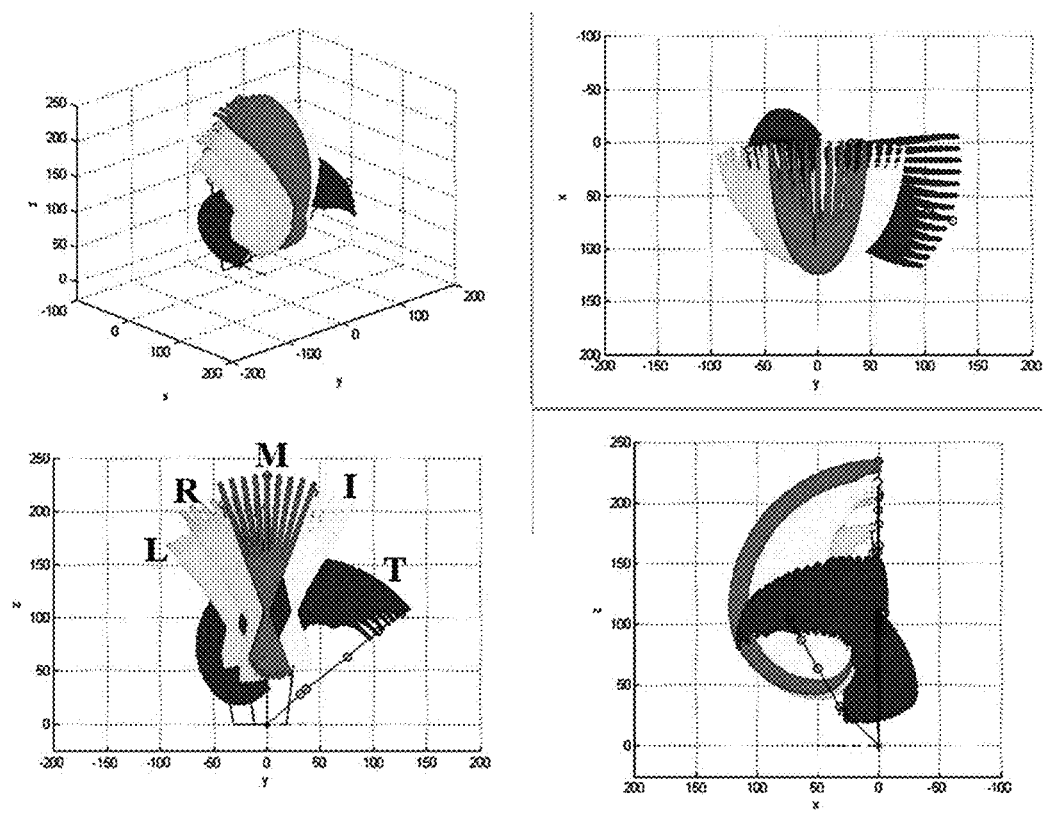
FIGS. 7A and 7B illustrate the results of the performance indicators according to an embodiment of the present invention by 3D modeling a Anthropomorphic DLR Hand.
Figure 7B:
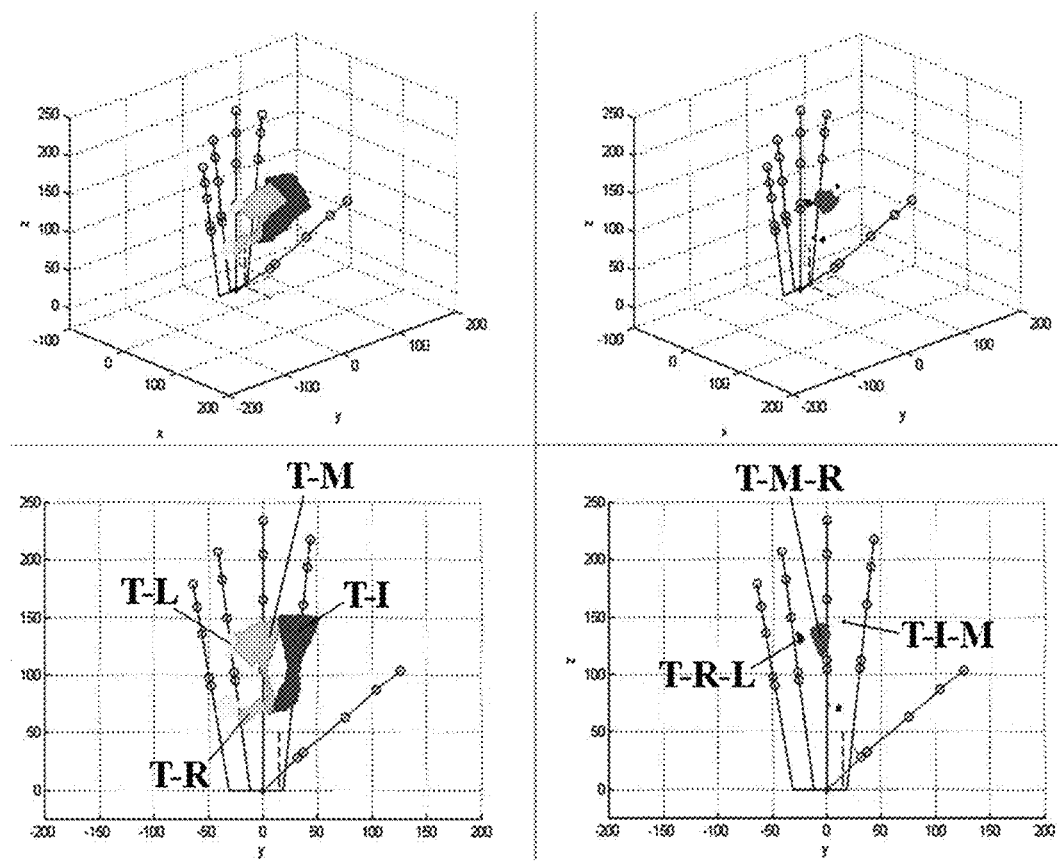
Figure 8A:
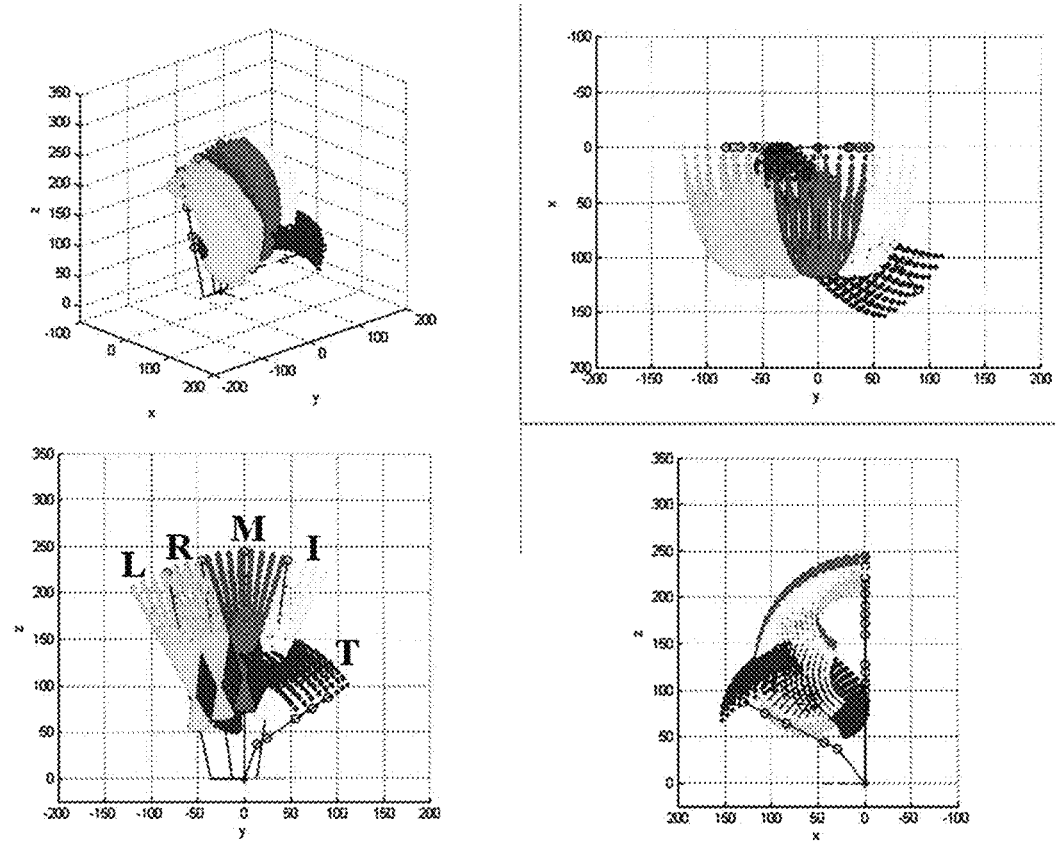
FIGS. 8A and 8B illustrate the results of the performance indicators according to an embodiment of the present invention by 3D modeling a UB hand 4.
Figure 8B:
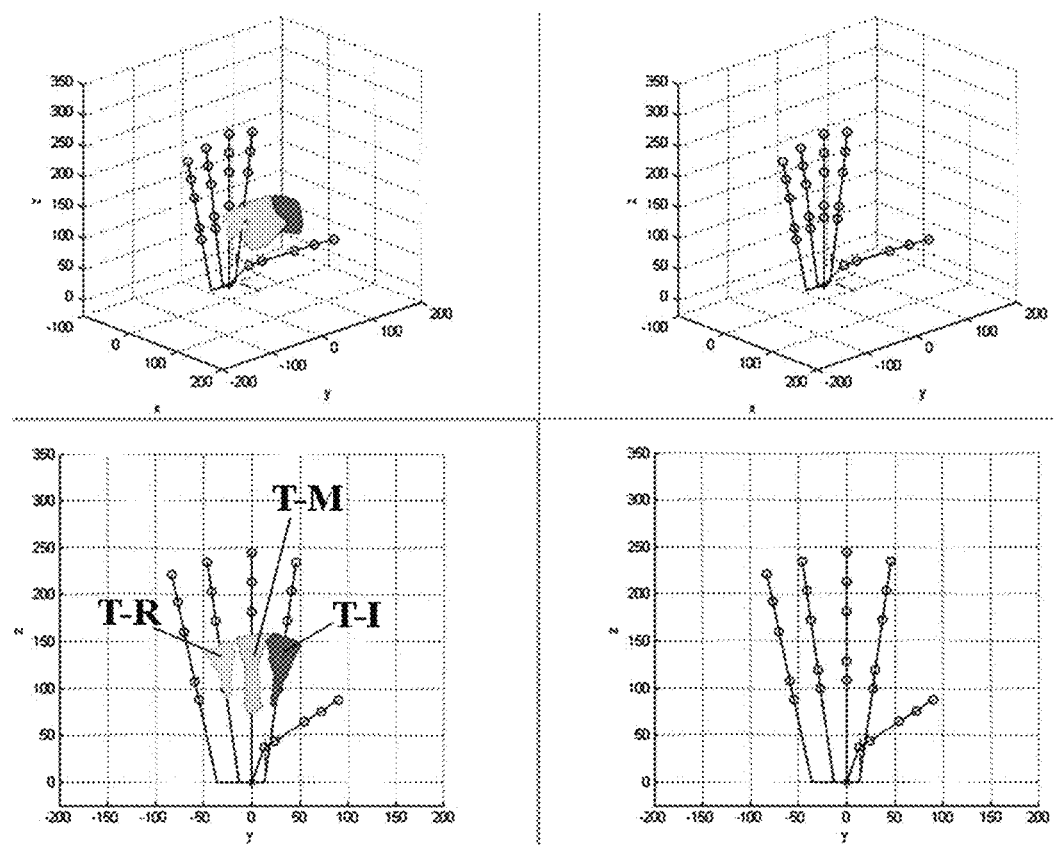
Figure 9A:
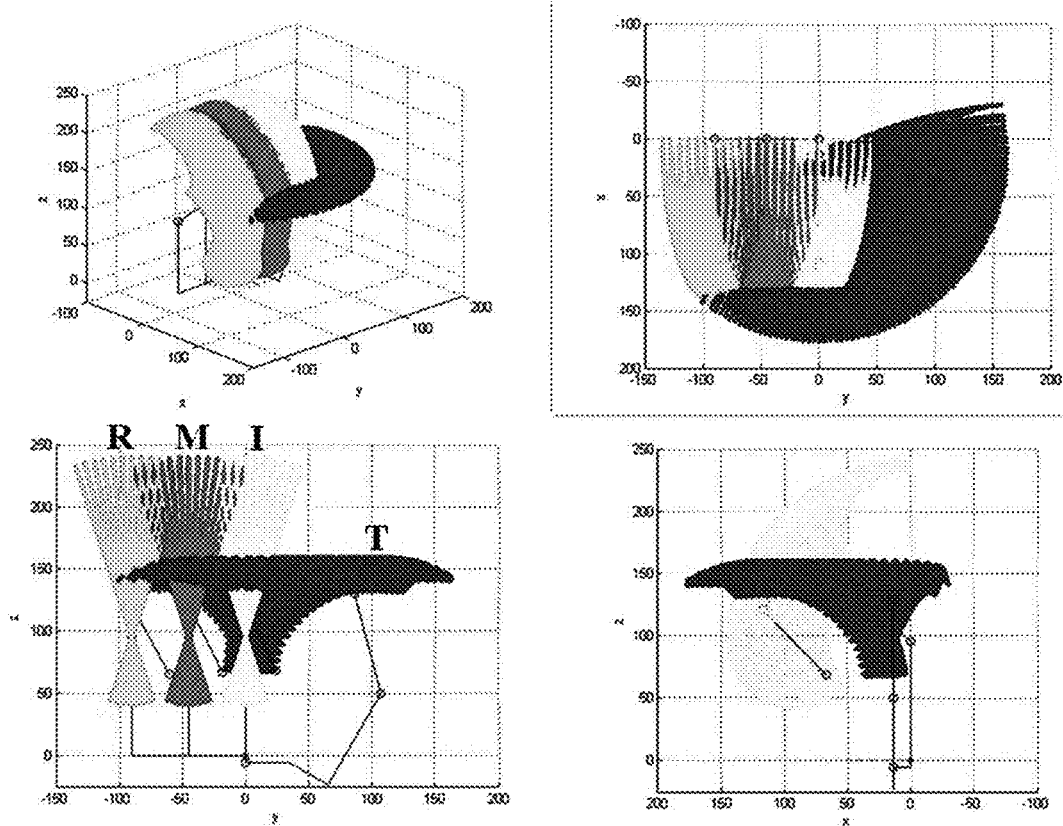
FIGS. 9A and 9B illustrate the result of the performance indicators according to an embodiment of the present invention by 3D modeling a SKKU Hand4.
Figure 9B:
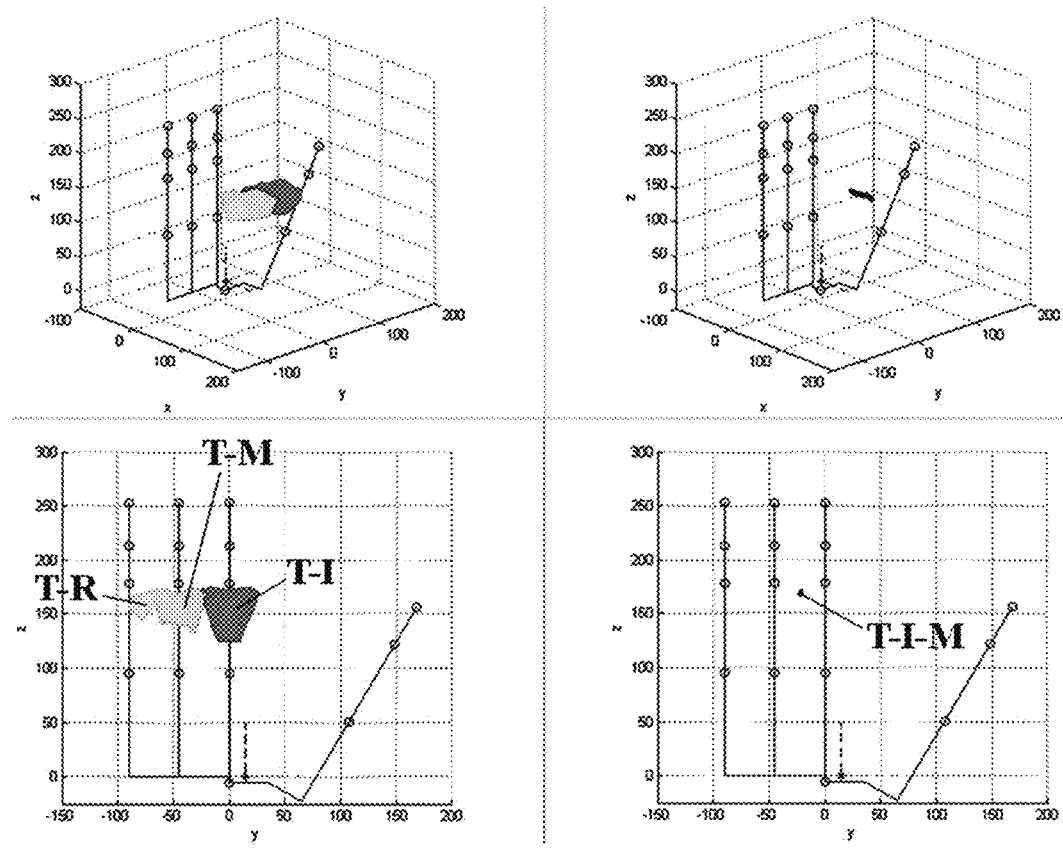

FIG. 7A-7B illustrate the results of the performance indicators according to an embodiment of the present invention by 3D modeling the Anthropomorphic DLR Hand. FIGS. 8A-8B illustrate the results of the performance indicators according to an embodiment of the present invention by 3D modeling the UB hand 4. FIGS. 9A-9B illustrate the result of the performance indicators according to an embodiment of the present invention by 3D modeling the SKKU Hand4.

Referring to FIG. 7A through FIG. 9B, T refers to a workspace of a thumb tip, I refers to a workspace of an index finger, M refers to a workspace of a middle finger tip, R refers to a workspace of a ring finger tip, and L refers to a workspace of a little finger tip. The workspace of each finger may be calculated by the step of calculating the finger workspace in the method of providing the performance indicators of the robot hand according to an embodiment of the present invention.

Further, X-Y refers to a range where an X finger tip and a Y finger tip can meet each other. For example, T-I refers to a range where the thumb tip and the index finger tip can meet each other, and this refers to the performance indicators calculated by the conventional 'opposability of thumb' that reflects only the range where the thumb tip can meet one finger tip among the finger tips.

On the other hand, X-Y-Z refers to a range where an X finger tip, a Y finger tip and a finger tip can meet one another. For example, T-I-M refers to a range where the thumb tip, the index finger tip and the middle finger tip can meet one another, and this refers to the performance indicators calculated by the 'interactivity of fingers' according to an embodiment of the present invention that reflects a range where the thumb tip, an arbitrary finger tip among the finger tips and another finger tip adjacent to the arbitrary finger tip can meet one another.

FIG. 10 shows the results of the performance indicators based on the conventional 'opposability of thumb' with regard to the existing robot hand models, and FIG. 11 shows the results of the performance indicators based on performance indicators according to an embodiment of the present invention with regard to the existing robot hand models.

Referring to FIG. 10, the performance indicators calculated by the conventional 'opposability of thumb' are tabulated with regard to the Anthropomorphic DLR hand, the UB hand 4 and the SKKU hand 4. According to the calculation results, the Anthropomorphic DLR hand and the UB hand 4 were evaluated as the robot hand models that have similar performance, but the performance of the SKKU hand 4 was undervalued as compared with the other robot hand models. The reason why the performance of the SKKU hand 4 is undervalued is because the thumb of the SKKU hand 4 is long and thus the SKKU hand 4 has a large workspace overlapped between the finger tips.

Referring to FIG. 11, the performance indicators calculated by the 'interactivity of fingers' according to an embodiment of the present invention are tabulated with regard to the Anthropomorphic DLR hand, the UB hand 4 and the SKKU hand 4. According to the calculation results, the performance indicators of the Anthropomorphic DLR hand calculated by the 'interactivity of fingers' are more excellent than those of the other two models on the contrary to the conventional 'opposability of thumb' where the Anthropomorphic DLR hand and the UB hand 4 were evaluated as having similar performance.

In the foregoing method of providing the performance indicators of the robot hand according to an embodiment of the present invention is not restrictively used in determining the performance of the robot hand but applicable to other robots for grasping an object. For example, the 'interactivity of fingers' may be used to determine performance of grasping an object with regard to a robot having three or more manipulators corresponding to the respective fingers. That is, the performance of the robot using three or more manipulators for grasping an object can be evaluated by the foregoing 'interactivity of fingers' that reflects a volume range where the tips of three manipulators can meet one another.

Below, a method of optimizing a structure of a robot hand according to an embodiment of the present invention will be described with reference to FIG. 12 to FIG. 15.

Figure 12:
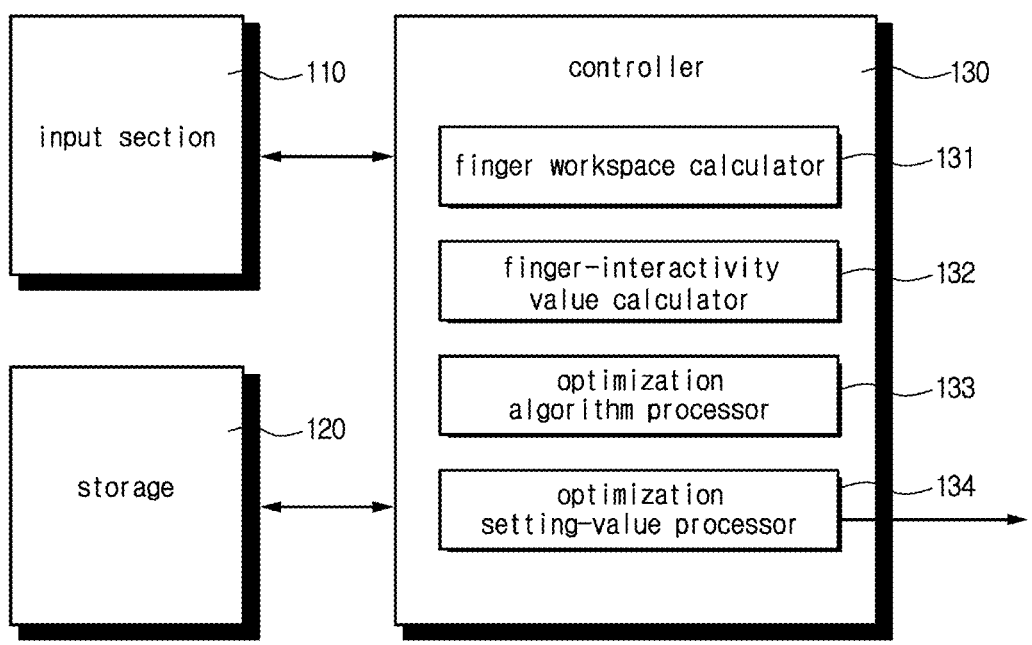
FIG. 12 is a block diagram of an operational system that computes a method of optimizing a structure of a robot hand according to an embodiment of the present invention.

FIG. 12 is a block diagram of an operational system that computes the method of optimizing the structure of the robot hand according to an embodiment of the present invention.

Referring to FIG. 12, an operational system 100 according to an embodiment of the present invention may include an input section 110, a storage 120 and a controller 130.

The input section 110 may receive initial setting values for a model of a robot hand structure and transmits the initial setting values to the controller 130.

The kind and meaning of input initial setting values are the same as those described with reference to FIG. 3 and FIG. 4, and thus repetitive descriptions thereof will be avoided as necessary.

The controller 130 may control operations of the input section 110 and the storage 120.

Further, the controller 130 may include a finger workspace calculator 131, a finger-interactivity value calculator 132, an optimization algorithm processor 133 and an optimization setting-value processor 134.

The controller 130 may receive the initial setting values for the model of the robot hand structure through the input section 110.

The finger workspace calculator 131 may calculate a distance $d_i$ between the start point O' of the thumb and the start point of the $i^{th}$ finger from the thumb start coordinates, the finger length setting values and the angle setting values, which are included in the received initial setting values.

In more detail, the finger workspace calculator 131 may calculate a distance $d_i$ between the start point O' of the thumb and the start point of the $i^{th}$ finger based on x, y and z coordinates of the thumb start point O', the length $L_t$ of the thumb, the lengths $L_f$ of the rest fingers, the angle values $q_r$ between the adjacent fingers with respect to the metacarpal, which are included in the received initial setting values.

Further, the finger workspace calculator 131 may calculate a workspace, in which the thumb tip and the rest finger tips are movable, based on the initial setting value received from the input section 110 and the distance di. Furthermore, a workspace overlapped among the thumb and the fingers may be also calculated.

The finger-interactivity value calculator 132 may calculate initial interactivity values between the fingers through the 'interactivity of fingers' with regard to the received initial setting values. Here, the 'interactivity of fingers' reflects a volume range where the thumb tip, an arbitrary finger tip among the finger tips and a finger tip adjacent to the arbitrary finger tip in the model of the robot hand structure can meet one another.

In more detail, the 'interactivity of fingers' according to an embodiment of the present invention is as follows.

$$IF = \frac{\sum_{i=1}^{n-1} w_i d_i}{(n-1)\theta_{total} L_t^2 L_f^2} \left( \sum_{i=1}^{n-1} w_i v_i + k \sum_{i=1}^{n-2} w_i w_{i+1} v_{ii+1} \right)$$

where, IF is the calculated interactivity value among the thumb and the fingers; $W_i$ is a weight coefficient of the $i^{th}$ finger previously stored in the storage 120 as a value previously assigned to the $i^{th}$ finger and ranging from 0 to 1; $d_i$ is a distance between the start point O' of the thumb and the start point of the $i^{th}$ finger; n is the number of thumb and fingers; n−1 is the number of fingers; $\theta_{total}$ is the total of movable range angle values of the joints included in the fingers controllable in the model of the robot hand structure; $L_t$ is the length of the thumb as a value included in the received initial setting values; $L_f$ is the length of the fingers as a value included in the received initial setting values; Vi is a volume range where the thumb tip and the $i^{th}$ finger tip can meet; $W_{i+1}$ is a weight coefficient of the $(i+1)^{th}$ finger previously stored in the storage as a vale previously assigned to the $(i+1)^{th}$ finger adjacent to the $i^{th}$ finger and ranging from 0 to 1; $V_{ii+1}$ is a volume range where the thumb tip, the $i^{th}$ finger tip and the $(i+1)^{th}$ finger tip adjacent to the $i^{th}$ finger can meet one another; and k is a compensation coefficient previously stored in the storage 120 to adjust an effect level of $V_i$ and $V_{ii+1}$.

The optimization algorithm processor 133 employs an optimization algorithm and the 'interactivity of fingers' to calculate a plurality of secondary interactivity values from the initial interactivity values calculated by the finger-interactivity value calculator 132 and the received initial setting values. For example, the optimization algorithm may be a genetic algorithm, but not limited thereto.

In more detail, the plurality of secondary interactivity values calculated by the optimization algorithm processor 133 according to an embodiment of the present invention will be described with reference to FIG. 14.

FIG. 14 tabulates results of optimization based on the genetic algorithm in the method of optimizing the structure of the robot hand according to an embodiment of the present invention.

Referring to FIG. 14, the optimization algorithm processor 133 calculates the plurality of secondary interactivity values by the optimization algorithm and the 'interactivity of fingers' from the initial interactivity value $(4.2086\times10^{-4})$ calculated by the finger-interactivity value calculator 132 and the received initial setting values.

For example, if the genetic algorithm is used as the optimization algorithm, n interactivity values are obtained from the initial setting values and (n−1) arbitrary setting values calculated from the initial setting values. At this time, the largest value among n interactivity values is the secondary interactivity value of the first generation. Next, excellent parent sets having an excellent value among n interactivity values are extracted, and crossed with each other to generate a child set. Again, the largest value between the parent set and the child set is the secondary interactivity value of the second generation. Once again, the excellent parent sets of the next generation having an excellent value are extracted and crossed with each other to generate a child set. Further, these processes are repeated.

Throughout a plurality of generations, the secondary interactivity values (1st to 7th) different from one another are obtained. At this time, the secondary interactivity values (1st to 7th) different from one another are obtained throughout the plurality of generations, but the secondary interactivity values calculated by the optimization algorithm processor 133 are not different any more throughout a predetermined number of generations (7th to 10th) and converge upon one value $(8.6506\times10^{-4})$ as shown in FIG. 14.

The optimization setting-value processor 134 determines whether the secondary interactivity values having one value are calculated more than a reference number of times previously stored in the storage 120 when the optimization algorithm processor 133 calculates the plurality of secondary interactivity values.

If it is determined that the secondary interactivity values are calculate more than the reference number of times, the optimization setting-value processor 134 extracts the maximum secondary interactivity value having the largest value among the plurality of secondary interactivity values calculated by the optimization algorithm processor 133.

Then, the optimization setting-value processor 134 may output the setting values of the extracted maximum interactivity value as the optimized setting value for the model of the robot hand structure corresponding to the initial setting values received through the input section 110 to the display (not shown) provided on the outside of the operational system 100.

Further, the optimization setting-value processor 134 may employ the 'interactivity of fingers' and the optimization algorithm used in the optimization algorithm processor 133 to extract the setting values of the extracted maximum secondary interactivity value.

In more detail, the optimized setting values output from the optimization setting-value processor 134 according to an embodiment of the present invention will be described with reference to FIG. 15.

FIG. 15 tabulates input initial setting values and optimized setting values in a robot hand model according to an embodiment of the present invention.

The optimization setting-value processor 134 according to an embodiment of the present invention extracts the setting values of the maximum secondary interactivity value and outputs them as the setting values optimized for the performance with respect to the setting values received through the input section 110.

Referring to FIG. 15, the maximum secondary interactivity value $(8.6506\times10^{-4})$ output from the optimization setting-value processor 134 is more than twice than the initial interactivity value $(4.2086\times10^{-4})$ calculated from the setting values received through the input section 110.

Below, the method of optimizing the structure of the robot hand according to an embodiment of the present invention will be described with reference to the accompanying drawings.

Figure 13:
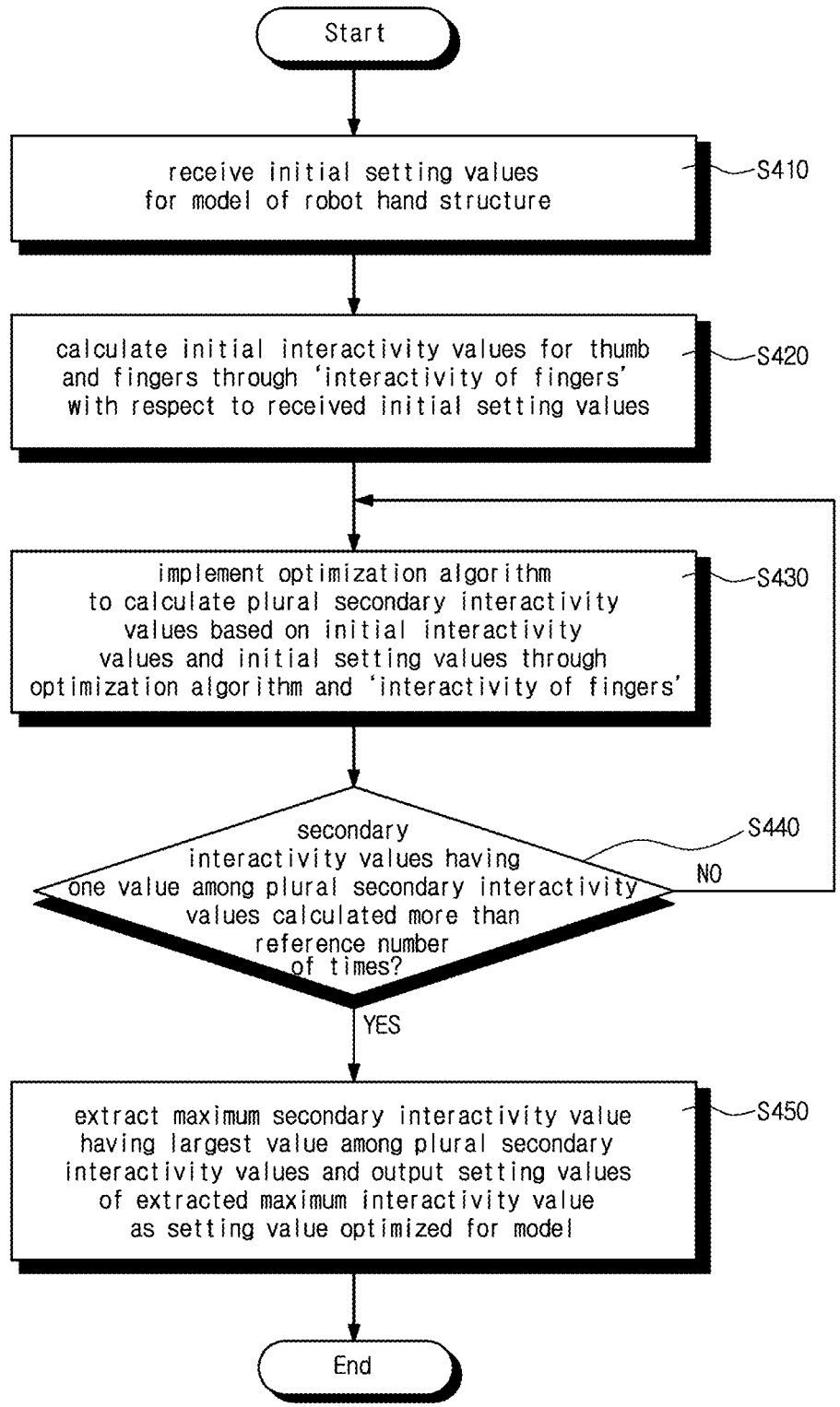
FIG. 13 is a flowchart of the method of optimizing the structure of the robot hand according to an embodiment of the present invention.

FIG. 13 is a flowchart of the method of optimizing the structure of the robot hand according to an embodiment of the present invention;

Referring to FIG. 13, the controller 130 of the operational system 100 according to an embodiment of the present invention performs a step of receiving the initial setting value to receive the initial setting values for the model of the robot hand structure through the input section 110 (S410).

Then, the controller 130 performs a step of calculating the interactivity value to calculate the initial interactivity values for the thumb and the fingers provided in the model of the robot hand structure through the 'interactivity of fingers' with respect to the received initial setting values (S420).

Further, the step of calculating the interactivity value performed in the controller 130 may further include a step of calculating a finger workspace to calculate the finger workspace that refers to a 3D spatial range where the thumb and the fingers provided in the model of the robot hand structure corresponding to the initial setting values received in the step of receiving the initial setting value are movable.

In more detail, the controller 130 may perform a step of calculating the finger workspace to calculate a distance di between the start point O' of the thumb and the start point of the $i^{th}$ finger based on the thumb start coordinates, the finger length setting values and the angle setting values, which are involved in the initial setting values received through the step of receiving the initial setting value.

Then, the controller 130 may perform a step of implementing an optimization algorithm to calculate the plurality of secondary interactivity values from the initial interactivity values calculated in the step of calculating the interactivity values and the initial setting values received in the step of receiving the initial setting value through the optimization algorithm and the 'interactivity of fingers' (S430).

Then, the controller 130 may determine whether the secondary interactivity values having one value are calculated more than a reference number of times previously stored in the storage 120 when the plurality of secondary interactivity values is calculated in the step of implementing the optimization algorithm (S440).

If it is determined that the secondary interactivity values having one value are calculate more than the reference number of times, the controller 130 extracts the maximum secondary interactivity value having the largest value among the plurality of secondary interactivity values calculated in the step of implementing the optimization algorithm, and outputs the setting values of the extracted maximum interactivity value as the setting value optimized for the model of the robot hand structure corresponding to the received setting values (S450).

According to an embodiment of the present invention, there is provided a method of providing performance indicators of a robot hand, in which a developer who designs the structure of the robot hand can receive objective performance indicators for the designed robot hand, and thus easily design the structure of the robot hand more excellent in performance than the conventional structure of the robot hand designed based on a developer's experience and inspiration.

Further, the method of providing the performance indicators of the robot hand according to an embodiment of the present invention provides objective performance indicators calculated based on essential factors required when designing the structure of the robot hand.

Further, the method of providing the performance indicators of the robot hand according to an embodiment of the present invention calculates and provides the performance indicators for determining each performance with respect to the lengths of the thumb and the fingers of the robot hand, the start point of the thumb, the motion angle of the thumb, etc.

Further, the method of providing the performance indicators of the robot hand according to an embodiment of the present invention provides objective performance indicators that serve as comparison criteria when the robot hands having different structures are compared with respect to the performance According to an embodiment of the present invention, there is provided a method of optimizing the structure of the robot hand, in which values corresponding to essential factors required when designing the structure of the robot hand are given as objective values calculated based on a genetic algorithm.

With the method of optimizing the structure of the robot hand according to an embodiment of the present invention, a developer who designs the structure of the robot hand can receive objective design criteria, and thus easily design the structure of the robot hand more excellent in shape-mimicking than the conventional structure of the robot hand designed based on a developer's experience and inspiration.

Further, the method of optimizing the structure of the robot hand according to an embodiment of the present invention calculates and provides the objective design criteria with respect to the lengths of the thumb and the fingers of the robot hand, the start point of the thumb, the motion angle of the thumb, etc.

Further, the method of optimizing the structure of the robot hand according to an embodiment of the present invention can systematically calculate and provide a position of a saddle joint, i.e. the start point of the thumb and an orientation of the thumb.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A processor-implemented method of optimizing a structure of a robot hand, comprising:
    receiving setting values for a model of a robot hand structure;
    determining movement of a thumb tip of a thumb and respective finger tips of fingers involved in the model based on the received setting values;
    determining performance indicators through interactivity of fingers (IF) that reflects a volume range where the thumb tip and two of the finger tips can meet one another; and
    optimizing the structure of the robot hand based on the determined performance indicators,
    wherein the setting values comprise an angle value obtained by rotating the thumb at a start point of the thumb,
    wherein the determining of the movement comprises determining a distance between the start point of the thumb and a start point of a finger among the fingers, and
    wherein the optimizing of the structure of the robot hand comprises manufacturing the robot hand based on the determined performance indicators.

2. The method according to claim 1, wherein the interactivity of fingers (IF) are the performance indicators that reflect the volume range where the thumb tip and the two of the finger tips comprise the thumb tip, an arbitrary finger tip among the finger tips, and a finger tip among the finger tips that is adjacent to the arbitrary finger tip.

3. The method according to claim 1, wherein the setting values comprise:
    finger length setting values for information about lengths of the thumb tip and the finger tips involved in the model;
    thumb start coordinates for the start point of the thumb involved in the model;
    angle setting values for information about an area where the thumb and the fingers involved in the model of the robot hand structure are movable; and
    joint movable range values for movable ranges of joints respectively corresponding to the thumb and the fingers involved in the model of the robot hand structure.

4. The method according to claim 3, wherein the receiving of the setting values comprises receiving a length value of the thumb and length values of the fingers when the fingers in the model have the same length, and receiving a length value of the thumb and an average length value of the fingers as the finger length setting values when the fingers in the model are different in length.

5. The method according to claim 4, wherein the joint movable range values comprise:
    a thumb proximal-interphalangeal-joint lateral-movable-range angle value indicating a movable range where a proximal interphalangeal joint of a thumb is movable laterally with respect to a metacarpal front in the model;
    a thumb proximal-interphalangeal-joint front-movable-range angle value indicating a movable range where the proximal interphalangeal joint of the thumb is movable toward the metacarpal;

a thumb middle-interphalangeal-joint front-movable-range angle value indicating a movable range where a middle interphalangeal joint of the thumb is movable toward the metacarpal;

a thumb distal-interphalangeal-joint front-movable-range angle value indicating a movable range where a distal interphalangeal joint of the thumb is movable toward the metacarpal;

a finger proximal-interphalangeal-joint lateral-movable-range angle value indicating a movable range where a proximal interphalangeal joint of each finger is movable laterally;

a finger proximal-interphalangeal-joint front-movable-range angle value indicating a movable range where the proximal interphalangeal joint of each finger is movable toward the metacarpal; and a finger middle and distal-interphalangeal-joint front-movable-range angle value indicating a movable range where the distal interphalangeal joint and the middle interphalangeal joint of each of the fingers are movable toward the metacarpal when the distal interphalangeal joint of the finger is designed to be movable depending on the middle interphalangeal joint, or a finger middle-interphalangeal-joint front-movable-range angle value indicating a movable range where the middle interphalangeal joint of each of the fingers is movable toward the metacarpal and a finger distal-interphalangeal-joint front-movable-range angle value indicating a movable range where the distal interphalangeal joint of each of the fingers is movable toward the metacarpal when the distal interphalangeal joint of the finger is designed to be movable independently of the middle interphalangeal joint.

6. The method according to claim 3, wherein the thumb start coordinates comprise x, y, and z coordinates of the start point of the thumb in a spatial coordinate system.

7. The method according to claim 6, wherein the angle setting values comprise:

angle values between adjacent fingers among the fingers with respect to a metacarpal;

an angle value obtained by rotating the thumb with respect to an x axis at the start point of the thumb;

an angle value obtained by rotating the thumb with respect to a y axis at the start point of the thumb on the spatial coordinate system; and an angle value obtained by rotating the thumb with respect to a z axis at the start point of the thumb on the spatial coordinate system.

8. The method according to claim 1, wherein the determining of the movement further comprises determining the distance between the start point of the thumb and the start point of the finger based on x, y, and z coordinates of the start point of the thumb, length values of remaining fingers among the fingers, and angle values between adjacent fingers among the fingers with respect to a metacarpal, which are included in the received setting values.

9. The method according to claim 1, wherein the interactivity of fingers (IF) is expressed as follows:

$$IF = \frac{\sum_{i=1}^{n-1} w_i d_i}{(n-1)\theta_{total} L_t^2 L_f^2} \left( \sum_{i=1}^{n-1} w_i v_i + k \sum_{i=1}^{n-2} w_i w_{i+1} v_{ii+1} \right)$$

where, IF is the interactivity value among the thumb and the fingers; $W_i$ is a weight coefficient of an $i^{th}$ finger previously stored in a storage as a value previously assigned to the $i^{th}$ finger and ranging from 0 to 1; $d_i$ is a distance between the start point of the thumb and the start point of the $i^{th}$ finger; n is a number of thumb and fingers; n−1 is a number of fingers; $\theta_{total}$ is a total of movable range angle values of joints included in the fingers that are controllable in the model of the robot hand structure; $L_t$ is a length of the thumb as a value included in the received setting values; $L_f$ is a length of the fingers as a value included in the setting values; Vi is a volume range where the thumb tip and an $i^{th}$ finger tip can meet; $W_{i+1}$ is a weight coefficient of an $(i+1)^{th}$ finger previously stored in the storage as a value previously assigned to the $(i+1)^{th}$ finger that is adjacent to the $i^{th}$ finger and ranging from 0 to 1; $V_{ii+1}$ is a volume range where the thumb tip, the $i^{th}$ finger tip, and an $(i+1)^{th}$ finger tip that is adjacent to the $i^{th}$ finger can meet one another; and k is a compensation coefficient previously stored in the storage to adjust an effect level of $V_i$ and $V_{ii+1}$.

10. The method according to claim 1, wherein the optimizing of the structure of the physical robot hand comprises manufacturing the physical robot hand based on the determined performance indicators.

11. A processor-implemented method of optimizing a structure of robot manipulators, comprising:

receiving setting values for a model of a manipulator structure of a robot that has three or more manipulators;

determining movement of respective manipulator tips of the manipulators involved in the model based on the received setting values;

determining performance indicators through interactivity of fingers (IF) that reflects a volume range where three of the manipulator tips can meet one another; and optimizing the structure of the robot manipulators based on the determined performance indicators, wherein the setting values comprise an angle value obtained by rotating a first manipulator, among the manipulators, at a start point of the first manipulator, wherein the determining of the movement comprises determining a distance between the start point of the first manipulator and a start point of a second manipulator among the manipulators, and wherein the optimizing of the structure of the robot manipulators comprises manufacturing the robot manipulators based on the determined performance indicators.

12. A processor-implemented method of optimizing a structure of a robot hand, comprising:

receiving initial setting values for a model of a robot hand structure;

determining initial interactivity values between a thumb and fingers through interactivity of fingers (IF) that reflects a volume range where a thumb tip of the thumb and two of respective finger tips of the fingers can meet one another, based on the received initial setting values;

determining a plurality of secondary interactivity values based on the initial interactivity values and the initial setting values by an optimization algorithm;

extracting a maximum secondary interactivity value among the plurality of secondary interactivity values;

determining optimized design values based on setting values of the extracted maximum secondary interactivity value; and optimizing the structure of the robot hand based on the determined optimized design values, wherein the initial setting values comprise an angle value obtained by rotating the thumb at a start point of the thumb, wherein the determining of the initial interactivity values comprises determining a finger movement that refers to a workspace where the thumb and the fingers provided in the model are movable, wherein the workspace is determined by determining a distance between the start point of the thumb and a start point of a finger among the fingers, and wherein the optimizing of the structure of the robot hand comprises manufacturing the robot hand based on the determined optimized design values.

13. The method according to claim 12, wherein the interactivity of fingers (IF) are performance indicators that reflect the volume range where the thumb tip and the two of the finger tips comprise the thumb tip, an arbitrary finger tip among the finger tips, and a finger tip among the finger tips that is adjacent to the arbitrary finger tip.

14. The method according to claim 12, wherein the initial setting values comprise:

finger length setting values for information about lengths of the thumb tip and the finger tips involved in the model;

thumb start coordinates for the start point of the thumb involved in the model;

angle setting values for information about an area where the thumb and the fingers involved in the model of the robot hand structure are movable; and joint movable range values for movable ranges of joints respectively corresponding to the thumb and the fingers involved in the model of the robot hand structure.

15. The method according to claim 14, wherein the receiving of the initial setting values comprises:

receiving a length value of the thumb and length values of the fingers as the finger length setting values when the fingers in the model have the same length, and receiving a length value of the thumb and an average length value of the fingers when the fingers in the model are different in length.

16. The method according to claim 15, wherein the joint movable range values comprise:

a thumb proximal-interphalangeal-joint lateral-movable-range angle value indicating a movable range where a proximal interphalangeal joint of the thumb is movable laterally with respect to a metacarpal front in the model;

a thumb proximal-interphalangeal-joint front-movable-range angle value indicating a movable range where the proximal interphalangeal joint of the thumb is movable toward the metacarpal;

a thumb middle-interphalangeal-joint front-movable-range angle value indicating a movable range where a middle interphalangeal joint of the thumb is movable toward the metacarpal;

a thumb distal-interphalangeal-joint front-movable-range angle value indicating a movable range where a distal interphalangeal joint of the thumb is movable toward the metacarpal;

a finger proximal-interphalangeal-joint lateral-movable-range angle value indicating a movable range where a proximal interphalangeal joint of each finger is movable laterally;

a finger proximal-interphalangeal-joint front-movable-range angle value indicating a movable range where the proximal interphalangeal joint of each finger is movable toward the metacarpal; and a finger middle and distal-interphalangeal-joint front-movable-range angle value indicating a movable range where the distal interphalangeal joint and the middle interphalangeal joint of each of the fingers are movable toward the metacarpal when the distal interphalangeal joint of the finger is designed to be movable depending on the middle interphalangeal joint, or a finger middle-interphalangeal-joint front-movable-range angle value indicating a movable range where the middle interphalangeal joint of each of the fingers is movable toward the metacarpal and a finger distal-interphalangeal-joint front-movable-range angle value indicating a movable range where the distal interphalangeal joint of each of the fingers is movable toward the metacarpal when the distal interphalangeal joint of the finger is designed to be movable independently of the middle interphalangeal joint.

17. The method according to claim 14, wherein the thumb start coordinates comprise x, y, and z coordinates of the start point of the thumb in a spatial coordinate system.

18. The method according to claim 17, wherein the angle setting values comprise:

angle values between adjacent fingers among the fingers with respect to a metacarpal;

an angle value obtained by rotating the thumb with respect to an x axis at the start point of the thumb;

an angle value obtained by rotating the thumb with respect to a y axis at the start point of the thumb on the spatial coordinate system; and an angle value obtained by rotating the thumb with respect to a z axis at the start point of the thumb on the spatial coordinate system.

19. The method according to claim 12, wherein the interactivity of fingers (IF) is expressed as follows:

$$\text{IF} = \frac{\sum_{i=1}^{n-1} w_i d_i}{(n-1)\theta_{total} L_t^2 L_f^2} \left( \sum_{i=1}^{n-1} w_i v_i + k \sum_{i=1}^{n-2} w_i w_{i+1} v_{ii+1} \right)$$

where, IF is the interactivity value among the thumb and the fingers; $W_i$ is a weight coefficient of an $i^{th}$ finger previously stored in a storage as a value previously assigned to the $i^{th}$ finger and ranging from 0 to 1; $d_i$ is a distance between the start point of the thumb and the start point of the $i^{th}$ finger; n is a number of thumb and fingers; n−1 is a number of fingers; $\theta_{total}$ is the total of movable range angle values of joints included in the fingers that are controllable in the model of the robot hand structure; $L_t$ is a length of the thumb as a value included in the received setting values; $L_f$ is the length of the fingers as a value included in the setting values; Vi is a volume range where the thumb tip and an $i^{th}$ finger tip can meet; $W_{i+1}$ is a weight coefficient of an $(i+1)^{th}$ finger previously stored in the storage as a value previously assigned to the $(i+1)^{th}$ finger that is adjacent to the $i^{th}$ finger and ranging from 0 to 1; $V_{ii+1}$ is a volume range where the thumb tip, the $i^{th}$ finger tip, and an $(i+1)^{th}$ finger tip that is adjacent to the $i^{th}$ finger can meet one another; and k is a compensation coefficient previously stored in the storage to adjust an effect level of $V_i$ and $V_{ii+1}$.

20. The method according to claim 19, wherein the workspace is determined by determining the distance between the start point of the thumb and the start point of the finger based on x, y, and z coordinates of the start point of the thumb, length values of remaining fingers among the fingers, and angle values between adjacent fingers among the fingers with respect to the metacarpal, which are included in the received initial setting values.

21. The method according to claim 12, wherein the optimization algorithm comprises a genetic algorithm.

22. A system of optimizing a structure of a robot hand, the system comprising:

an input section configured to receive setting values for a model of a robot hand structure; and a controller comprising:

a finger workspace determiner configured to determine movement of a thumb tip of a thumb and respective finger tips of fingers involved in the model based on the received setting values;

a performance indicator determiner configured to determine performance indicators through interactivity of fingers (IF) that reflects a volume range where the thumb tip and two of the finger tips can meet one another; and a performance indicator processor configured to output the determined performance indicators as the performance indicators for the model of the robot hand structure indicated by the received setting values, wherein the setting values comprise an angle value obtained by rotating the thumb at a start point of the thumb, wherein the finger workspace determiner is further configured to determine the movement by determining a distance between the start point of the thumb and a start point of a finger among the fingers, wherein the structure of the robot hand is optimized by manufacturing the robot hand based on the determined performance indicators.

\* \* \* \* \*